(12) United States Patent
Kim

(10) Patent No.: US 12,507,117 B2
(45) Date of Patent: Dec. 23, 2025

(54) METHOD AND DEVICE FOR PROCESSING DATA IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/754,569

(22) PCT Filed: Nov. 26, 2018

(86) PCT No.: PCT/KR2018/014645
§ 371 (c)(1),
(2) Date: Apr. 8, 2020

(87) PCT Pub. No.: WO2019/103558
PCT Pub. Date: May 31, 2019

(65) Prior Publication Data
US 2020/0351712 A1 Nov. 5, 2020

(30) Foreign Application Priority Data
Nov. 24, 2017 (KR) .................. 10-2017-0158572

(51) Int. Cl.
*H04W 28/06* (2009.01)
*H04L 47/34* (2022.01)
*H04L 69/04* (2022.01)

(52) U.S. Cl.
CPC .......... *H04W 28/065* (2013.01); *H04L 47/34* (2013.01); *H04L 69/04* (2013.01)

(58) Field of Classification Search
CPC ......... H04L 69/04; H04L 67/12; H04L 69/22; H04L 69/40; H04L 47/34; H04W 28/065; H04W 12/033; H04W 28/06; H04W 80/02
See application file for complete search history.

(56) References Cited

U.S. PATENT DOCUMENTS 10,805,430 B2  10/2020 Raina et al.
2016/0337255 A1* 11/2016 Balasubramanian ... H04L 47/38
(Continued)

FOREIGN PATENT DOCUMENTS

CN   105765929 A   7/2016
CN   107094142 A   8/2017
(Continued)

OTHER PUBLICATIONS

CATT, "Consideration on signaling and procedures for UDC," R2-1710721, Oct. 9-13, 2017.*
(Continued)

*Primary Examiner* — Mandish K Randhawa
(74) *Attorney, Agent, or Firm* — Jefferson IP Law, LLP

(57) ABSTRACT

A method of processing data in a wireless communication system, the method being performed by a transmitting packet data convergence protocol (PDCP) entity, includes: receiving data from an upper layer; perform compression on the received data based on uplink data compression (UDC) configuration information; perform ciphering on the compressed data; and adding a UDC header and a PDCP header to the ciphered data and transmitting the resulting data to a lower layer.

6 Claims, 16 Drawing Sheets

(56) References Cited

U.S. PATENT DOCUMENTS

2020/0059819 A1 2/2020 Ahmadzadeh et al.
2020/0396640 A1 12/2020 Quan et al.

FOREIGN PATENT DOCUMENTS

| CN | 107113291 A | | 8/2017 |
|---|---|---|---|
| CN | 107302585 | * | 10/2017 |
| KR | 10-2014-0073116 A1 | | 6/2014 |
| KR | 10-2017-0083548 A | | 7/2017 |

OTHER PUBLICATIONS

Addendum A R2-1902318 Correction on UDC data format.*
CATT, "Introduction of Deflate based UDC Solution", R2-1712070, 3GPP TSG-RAN2 Meeting #99bis, Prague, Czech Republic, Oct. 27, 2017.
Huawei et al, "Discussion on setup and release of UDC", R2-1712721, 3GPP TSG RAN2 Meeting #100, Reno, Nevada, USA, Nov. 17, 2017.
CATT, "PDCP impact analysis", R2-1710723, 3GPP TSG-RAN WG2 #99bis, Prague, Czech Republic, Sep. 29, 2017.
Huawei et al, "Discussion on UDC functionality in PDCP layer", R2-1712722, 3GPP TSG RAN2 Meeting #100, Reno, Nevada, USA, Nov. 17, 2017.
International Search Report dated Mar. 4, 2019, issued in International Patent Application No. PCT/KR2018/014645.
CATT: "Introduction of Deflate based UDC Solution", R2-1710724, XP051342011, Oct. 8, 2017, 3GPP Draft; 36323 CRXXXX (REL-15) R2-1710724, 3rd Generation Partnership Project (3GPP), Mobile Competence Centre; 650, Route Des Lucioles ; F-06921 Sophia-Antipolis Cedex, France, vol. RAN WG2, No. Prague, Czech Republic.
3gpp TS 36.331 V14.4.0: 3rd Generation Partership Project; Technical Specification Group Radio Access Network; Evolved Universal Terrestiral Radio Access (E-UTRA); Radio Resource Control(RRC); Protocol specification (Release 14), (Sep. 1, 2017), XP055711536.
Vice-Chairman (CMCC): "Report from LTE Break-Out session (eVoLTE, Mobility enh, feMBMS, UDC)", R2-1703897, XP051254816, Apr. 8, 2017.
Extended European Search Report dated Jul. 16, 2020, issued in European Application No. 18880977.6.
Korean Office Action dated May 28, 2022, issued in a counterpart Korean Application No. 10-2017-0158572.
European Office Action dated Jun. 24, 2022, issued in a counterpart European Application No. 18880977.6.
Korean Notice of Allowance dated Dec. 7, 2022, issued in a counterpart Korean Application No. 10-2017-0158572.
European Office Action dated Dec. 15, 2022, issued in a counterpart European Application No. 18880977.6.
Korean Office Action dated Mar. 20, 2023, issued in Korean Patent Application No. 10-2023-0019531.
Chinese Office Action dated Jul. 11, 2023, issued in Chinese Patent Application No. 201880075419.X.
European Notice of Allowance dated Aug. 17, 2023, issued in European Patent Application No. 18880977.6.
Chinese Notice of Allowance dated Jan. 12, 2024, issued in Chinese Patent Application No. 201880075419.X.
European Notice of Allowance dated Nov. 9, 2023, issued in European Patent Application No. 18880977.6.
Extended European Search Report dated Apr. 26, 2024, issued in European Patent Application No. 24156419.4.

* cited by examiner

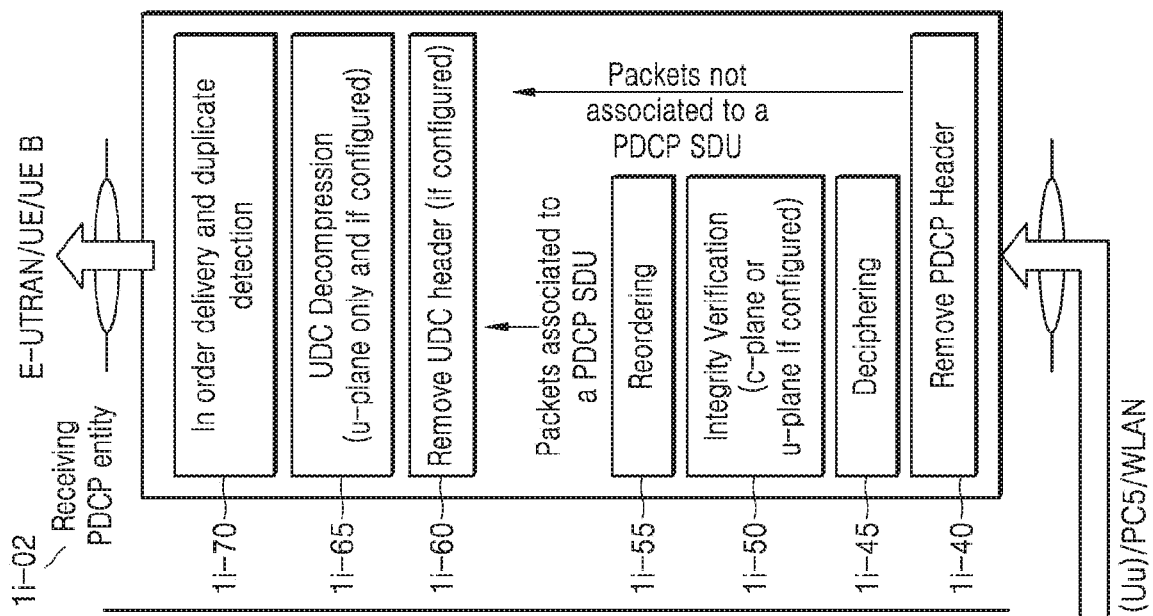
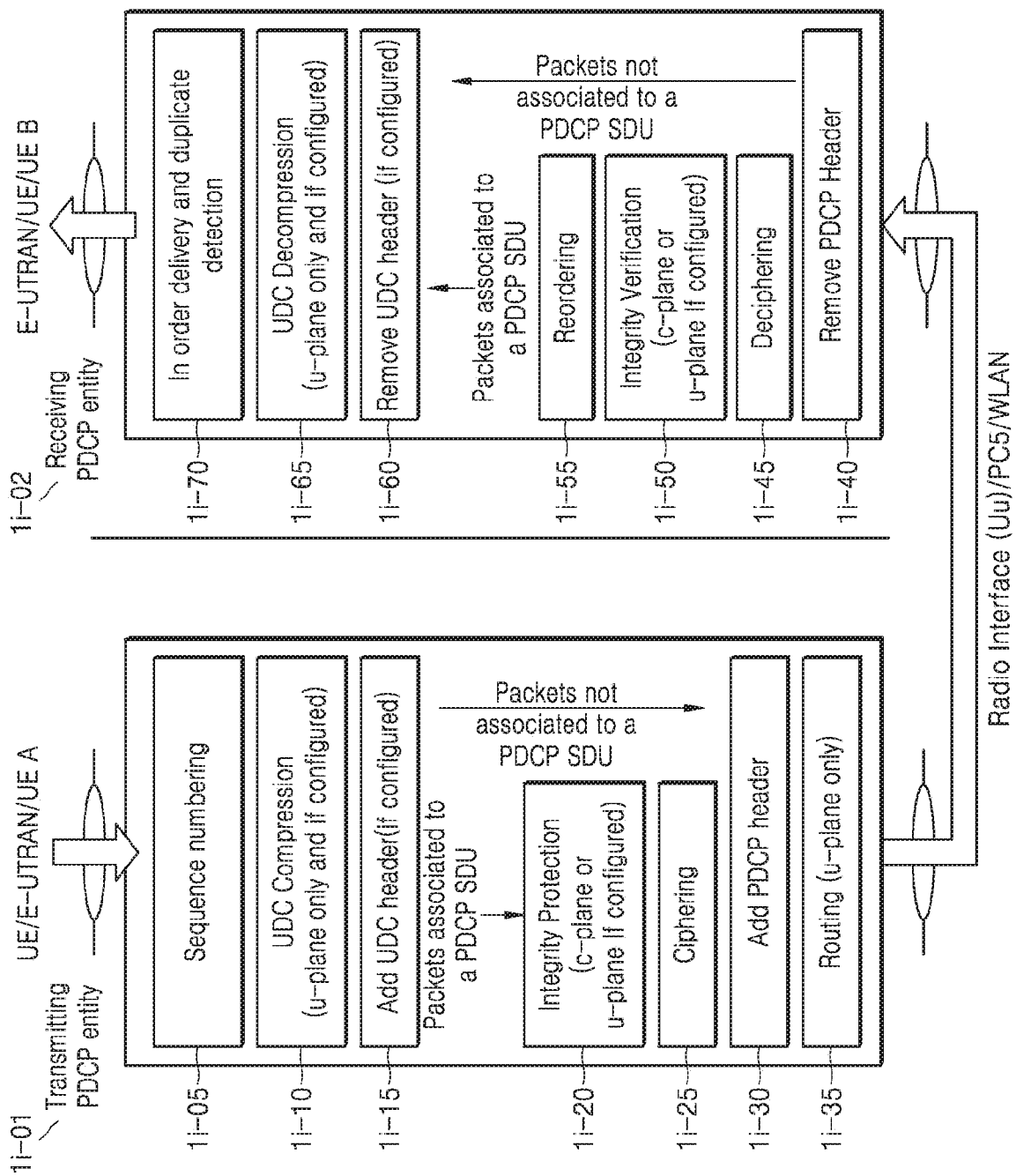
FIG. 1I

METHOD AND DEVICE FOR PROCESSING DATA IN WIRELESS COMMUNICATION SYSTEM

TECHNICAL FIELD

The present disclosure relates to a method and apparatus for processing data in a wireless communication system.

BACKGROUND ART

To meet increasing demand with respect to wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60 GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, healthcare, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As various services may be provided according to the foregoing and the development of wireless communication systems, methods for smoothly providing such services are required.

DESCRIPTION OF EMBODIMENTS

Technical Problem

Provided are a method and apparatus for smoothly providing a service in a wireless communication system.

Solution to Problem

According to an embodiment, a method of processing data in a wireless communication system includes: receiving data and reordering the received data in order of packet data convergence protocol (PDCP) sequence number; determining whether to apply uplink data compression (UDC) to each data; processing data by using a hardware accelerator; and transmitting the processed data to an upper layer.

Advantageous Effects of Disclosure

According to the described embodiment, a service may be smoothly provided in the wireless communication system.

BRIEF DESCRIPTION OF DRAWINGS

FIG. 1I is a diagram illustrating a process in which a transmitting PDCP entity performs UDC and transmission and a receiving PDCP entity performs decompression on data resulting from the UDC and transmits the decompressed data to an upper layer, according to another embodiment.

FIG. 1O is a block diagram illustrating a structure of a terminal according to an embodiment.

BEST MODE

Figure 1A:
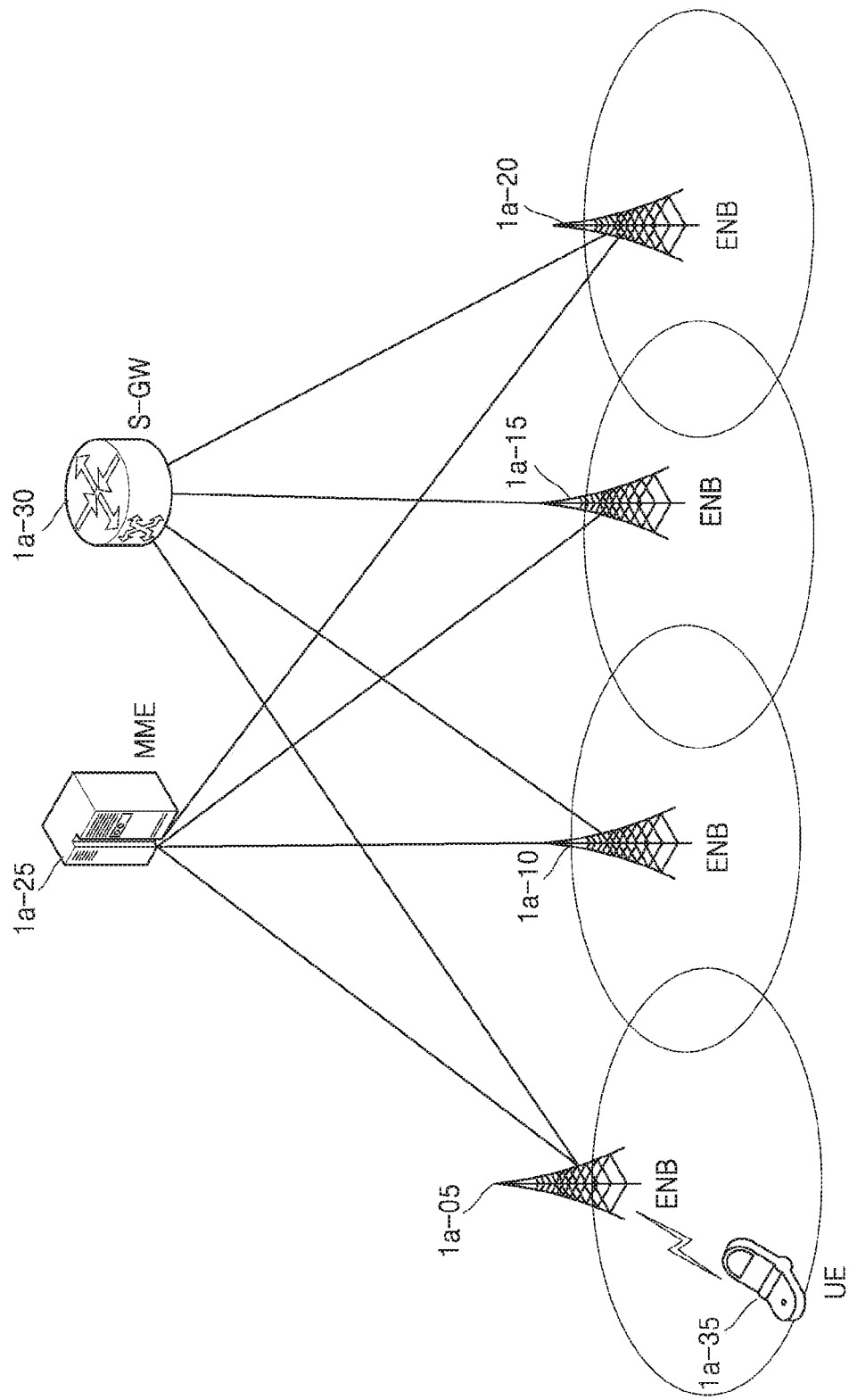
FIG. 1A is a diagram illustrating a structure of a long term evolution (LTE) system.

According to an embodiment, a method of processing data in a wireless communication system, the method being performed by a transmitting packet data convergence protocol (PDCP) entity, includes: receiving data from an upper layer; performing compression on the received data based on uplink data compression (UDC) configuration information; performing ciphering on the compressed data; and adding a UDC header and a PDCP header to the ciphered data and transmitting the resulting data to a lower layer.

According to an embodiment, the method may further include performing ciphering on the received data without compressing the received data based on the UDC configuration information.

According to an embodiment, the method may further include determining whether to compress the received data based on the UDC configuration information, wherein data to be compressed and data not to be compressed may be processed in parallel separately from each other.

According to an embodiment, a hardware accelerator may be used to process at least one of the data to be compressed and the data not to be compressed.

According to an embodiment, the UDC header may include at least one of an indicator indicating whether UDC configuration has been applied and a checksum bit for checking validity of a buffer.

According to an embodiment, the method may further include receiving the UDC configuration information via higher layer signaling.

According to an embodiment, a method of processing data in a wireless communication system, the method being performed by a receiving PDCP entity, includes: receiving data from a lower layer; removing a PDCP header and a UDC header from the received data; performing deciphering on data resulting from the removing of the PDCP header and the UDC header; reordering the deciphered data in order of PDCP sequence number; performing decompression on the reordered data based on the UDC header; and transmitting the decompressed data to an upper layer.

According to an embodiment, the method may further include transmitting the reordered data to the upper layer without performing decompression on the reordered data based on the UDC header.

According to an embodiment, the method may further include determining whether to decompress the reordered data based on the UDC header, wherein data to be decompressed and data not to be decompressed may be processed in parallel separately from each other.

According to an embodiment, a hardware accelerator may be used to process at least one of the data to be decompressed and the data not to be decompressed.

According to an embodiment, the decompressed data and the undecompressed data processed in parallel may be transmitted to the upper layer in order of completion of processing.

According to an embodiment, the UDC header may include at least one of an indicator indicating whether UDC configuration has been applied and a checksum bit for checking validity of a buffer.

According to an embodiment, the method may further include determining whether a checksum failure or a checksum error has occurred by using the checksum bit included in the UDC header, wherein, when the checksum failure or the checksum error has occurred, the deciphering may not be performed on data in which the checksum failure or the checksum error occurs.

According to an embodiment, a transmitting PDCP entity for processing data in a wireless communication system includes: a transceiver; at least one storage storing a program for processing data; and at least one processor configured to receive data from an upper layer, perform compression on the received data based on UDC configuration information, perform cipher on the compressed data, and add a UDC header and a PDCP header to the ciphered data and transmit the resulting data to a lower layer.

According to an embodiment, a PDCP entity for processing data in a wireless communication system includes: a transceiver; at least one storage storing a program for processing data; and at least one processor configured to receive data from a lower layer, remove a PDCP header and a UDC header from the received data, perform deciphering on data resulting from the removing of the PDCP header and the UDC header, reorder the deciphered data in order of PDCP sequence number, perform decompression on the reordered data based on the UDC header, and transmit the decompressed data to an upper layer.

According to an embodiment, a method of processing data in a wireless communication system includes: receiving data and reordering the received data in order of PDCP sequence number; determining whether to apply UDC to each data; processing data by using a hardware accelerator; and transmitting the processed data to an upper layer.

MODE OF DISCLOSURE

Hereinafter, embodiments of the present disclosure will be described in detail with reference to the accompanying drawings.

In describing the embodiments, descriptions of technical contents that are well known in the technical field to which the present disclosure belongs and are not directly related to the present disclosure will be omitted. This is to more clearly convey the subject matter of the present disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the present disclosure and the accomplishing methods thereof will become apparent from the embodiments described below in detail with reference to the accompanying drawings. The present disclosure may, however, be embodied in many different forms and should not be construed as being limited to the embodiments set forth herein; rather, these embodiments are provided such that this disclosure will be thorough and complete, and will fully convey the scope of the present disclosure to those of ordinary skill in the art. Like reference numerals refer to like elements throughout the specification.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~ unit" used in the present embodiments may refer to a software component or a hardware component such as a field programmable gate array (FPGA) or an application specific integrated circuit (ASIC) and the "~ unit" may perform certain functions. However, the "~ unit" is not limited to software or hardware. The "~ unit" may be configured to be in an addressable storage medium or may be configured to operate one or more processors. Thus, as an example, the "~ unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units". In addition, the components and "~ units" may be implemented to operate one or more central processing units (CPUs) in a device or a security multimedia card. Also, in embodiments, the "~ unit" may include one or more processors.

In the following description, terms for identifying access nodes, terms referring to network entities, terms referring to messages, terms referring to interfaces between network entities, terms referring to various identification information, and the like are illustrated for convenience of description. Thus, the present disclosure is not limited to the terms described below and other terms referring to objects having equivalent technical meanings may be used.

In the following description, terms and names defined in the 3rd generation partnership project long term evolution (3GPP LTE) standards or modified terms and names based thereon may be used for convenience of description. However, the present disclosure is not limited to such terms and names and may be similarly applied to systems according to other standards.

FIG. 1A is a diagram illustrating a structure of an LTE system.

Referring to FIG. 1A, as illustrated, a radio access network of the LTE system may include next-generation base stations (e.g., evolved Node Bs (eNBs), Node Bs, or base stations) 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 may access an external network through the eNBs 1a-05 to 1a-20 and the S-GW 1a-30.

In FIG. 1A, the eNBs 1a-05 to 1a-20 may be access nodes of cellular networks, may provide radio access to terminals accessing the networks, and may correspond to existing Node Bs of UMTS systems. The eNB may be connected to the UE 1a-35 through a wireless channel and may perform a more complex function than the existing Node B. In the LTE system, because all user traffic including real-time services such as Voice over IP (VoIP) through the Internet protocol is serviced through a shared channel, an apparatus for collecting and scheduling state information such as UEs' buffer states, available transmission power states, or channel states may be required, which may be managed by the eNBs 1a-05 to 1a-20. That is, the eNBs 1a-05 to 1a-20 may support the connection between the terminals and a core network (CN). One eNB may generally control a plurality of cells. For example, in order to implement a transmission rate of 100 Mbps, the LTE system may use orthogonal frequency division multiplexing (OFDM) in a 20 MHz bandwidth as a radio access technology. Also, an adaptive modulation & coding (AMC) scheme may be applied to determine a modulation scheme and a channel coding rate according to the channel state of a terminal. The S-GW 1a-30 may be an apparatus for providing a data bearer and may generate or remove a data bearer under the control of the MME 1a-25. The MME 1a-25 may be an apparatus for managing various control functions as well as a mobility management function for a terminal and may be connected to a plurality of base stations. The MME 1a-25 and the S-GW 1a-30 may further perform authentication, bearer management, or the like for the terminal accessing the network and may process packets received from the eNBs 1a-05 to 1a-20 or packets to be transmitted to the eNBs 1a-05 to 1a-20.

Figure 1B:
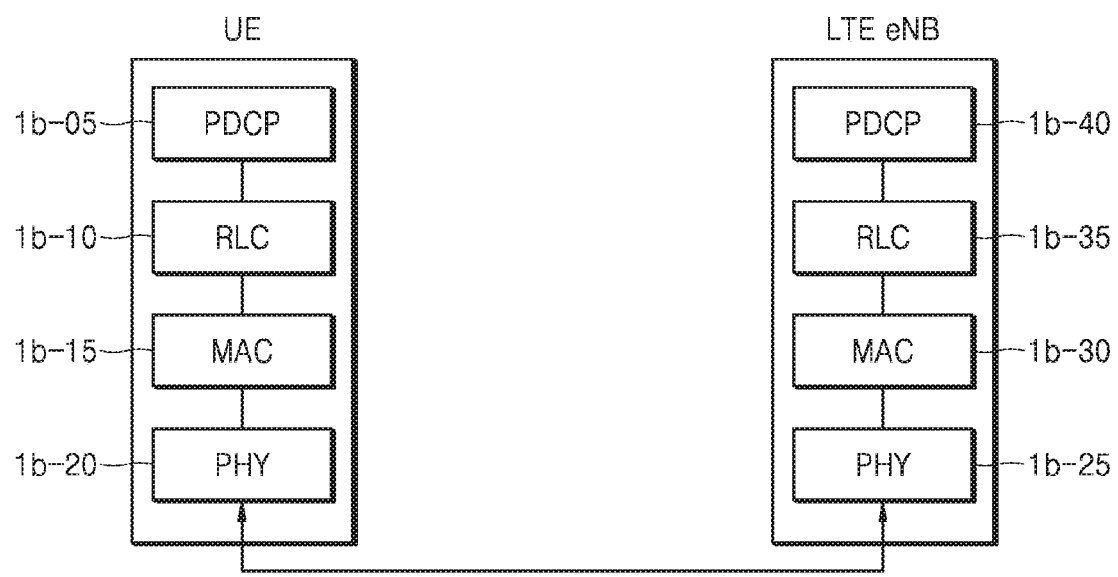
FIG. 1B is a diagram illustrating a radio protocol architecture in an LTE system.

FIG. 1B is a diagram illustrating a radio protocol architecture in an LTE system.

Referring to FIG. 1B, the radio protocol of the LTE system may include Packet Data Convergence Protocol (PDCP) 1b-05 and 1b-40, Radio Link Control (RLC) 1b-10 and 1b-35, and Medium Access Control (MAC) 1b-15 and 1b-30 in a terminal and an eNB, respectively. The PDCP 1b-05 and 1b-40 may manage operations such as IP header compression/restoration. The main functions of the PDCP may be summarized as follows.

Header compression and decompression function (Header compression and decompression: ROHC only)
User data transmission function (Transfer of user data)
Sequential transmission function (In-sequence delivery of upper layer PDUs at PDCP re-establishment procedure for RLC AM)
Reordering function (For split bearers in DC (only support for RLC AM): PDCP PDU routing for transmission and PDCP PDU reordering for reception)
Duplicate detection function (Duplicate detection of lower layer SDUs at PDCP re-establishment procedure for RLC AM)
Retransmission function (Retransmission of PDCP SDUs at handover and, for split bearers in DC, of PDCP PDUs at PDCP data-recovery procedure, for RLC AM)
Ciphering and deciphering function (Ciphering and deciphering)
Timer-based SDU discard function (Timer-based SDU discard in uplink)

The radio link control (RLC) 1b-10 and 1b-35 may reconfigure a PDCP packet data unit (PDU) in a suitable size to perform an ARQ operation or the like. The main functions of the RLC may be summarized as follows.

Data transmission function (Transfer of upper layer PDUs)
ARQ function (Error Correction through ARQ (only for AM data transfer))
Concatenation, segmentation, and reassembly function (Concatenation, segmentation, and reassembly of RLC SDUs (only for UM and AM data transfer))
Re-segmentation function (Re-segmentation of RLC data PDUs (only for AM data transfer))
Reordering function (Reordering of RLC data PDUs (only for UM and AM data transfer))
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function (RLC re-establishment)

The MAC 1b-15 and 1b-30 may be connected to several RLC entities configured in one terminal and may perform an operation of multiplexing RLC PDUs into MAC PDUs and demultiplexing RLC PDUs from MAC PDUs. The main functions of the MAC may be summarized as follows.

Mapping function (Mapping between logical channels and transport channels)
  Multiplexing and demultiplexing function (Multiplexing/demultiplexing of MAC SDUs belonging to one or different logical channels into/from transport blocks (TB) delivered to/from the physical layer on transport channels)
Scheduling information report function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

Physical layers 1b-20 and 1b-25 may channel-code and modulate upper layer data, generate OFDM symbols, and transmit the same through wireless channels or may demodulate and channel-decode OFDM symbols received through wireless channels and transmit the result thereof to the upper layer.

Figure 1C:
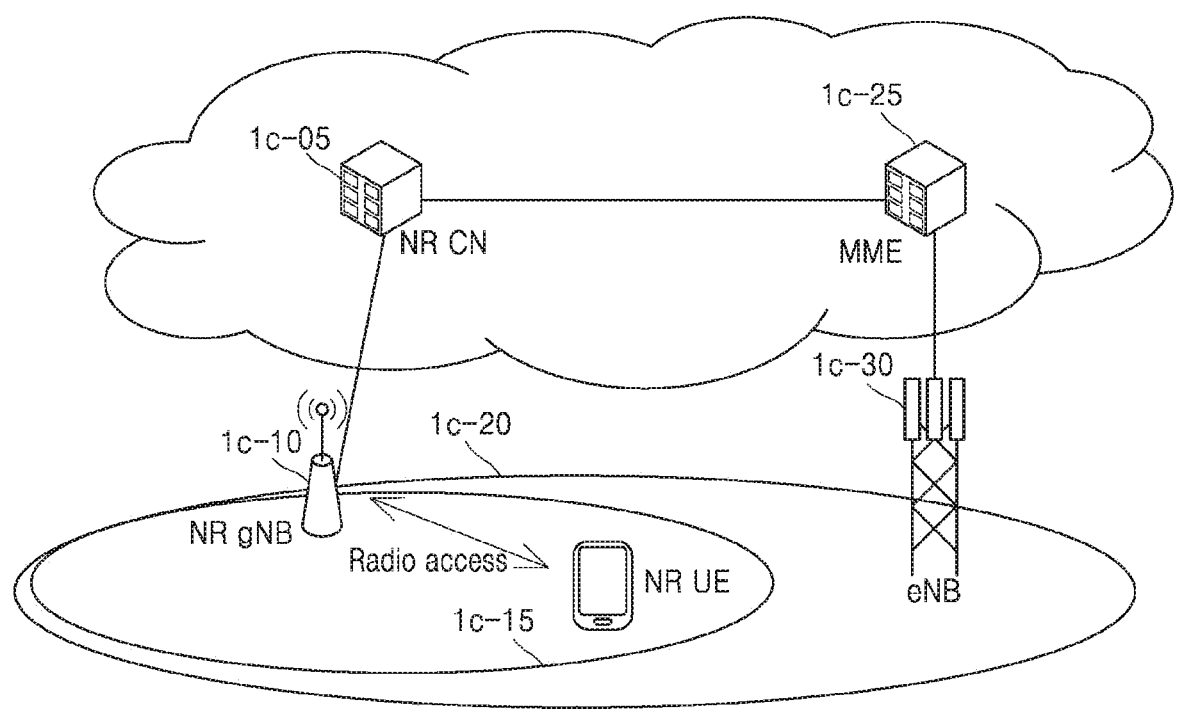
FIG. 1C is a diagram illustrating a structure of a next-generation mobile communication system to which an embodiment is applied.

FIG. 1C is a diagram illustrating a structure of a next-generation mobile communication system to which an embodiment is applied.

Referring to FIG. 1C, a radio access network of the next-generation mobile communication system (hereinafter referred to as NR or 5G) may include a next-generation base station (e.g., a new radio Node B (NR NB), an NR gNB, or an NR base station) 1c-10 and a new radio core network (NR CN) or next-generation core network (NG CN) 1c-05. A user terminal (e.g., a new radio user equipment (NR UE) or a terminal) 1c-15 may access an external network through the NR gNB 1c-10 and the NR CN 1c-05.

In FIG. 1C, the NR gNB 1c-10 may correspond to an evolved Node B (eNB) of the existing LTE system. The NR gNB may be connected to the NR UE 1c-15 through a wireless channel and may provide a better service than the existing Node B. In the next-generation mobile communication system, because all user traffic is serviced through a shared channel, an apparatus for collecting and scheduling state information such as UEs' buffer states, available transmission power states, or channel states may be required, which may be managed by the NR gNB 1c-10. One NR gNB may generally control a plurality of cells. In order to implement ultra-high speed data transmission in comparison with the LTE, an existing maximum bandwidth or more may be provided and a beamforming technology may be additionally grafted by using orthogonal frequency division multiplexing (OFDM) as a radio access technology. Also, an adaptive modulation & coding (AMC) scheme may be applied to determine a modulation scheme and a channel coding rate according to the channel state of a terminal. The NR CN 1c-05 may perform functions such as mobility support, bearer setup, and Quality of Service (QoS) setup. The NR CN may be an apparatus for managing various control functions as well as a mobility management function for a terminal and may be connected to a plurality of base stations. Also, the next-generation mobile communication system may also be linked with the existing LTE system, and the NR CN may be connected to an MME 1c-25 through a network interface. The MME may be connected to an eNB 1c-30 that is an existing base station.

Figure 1D:
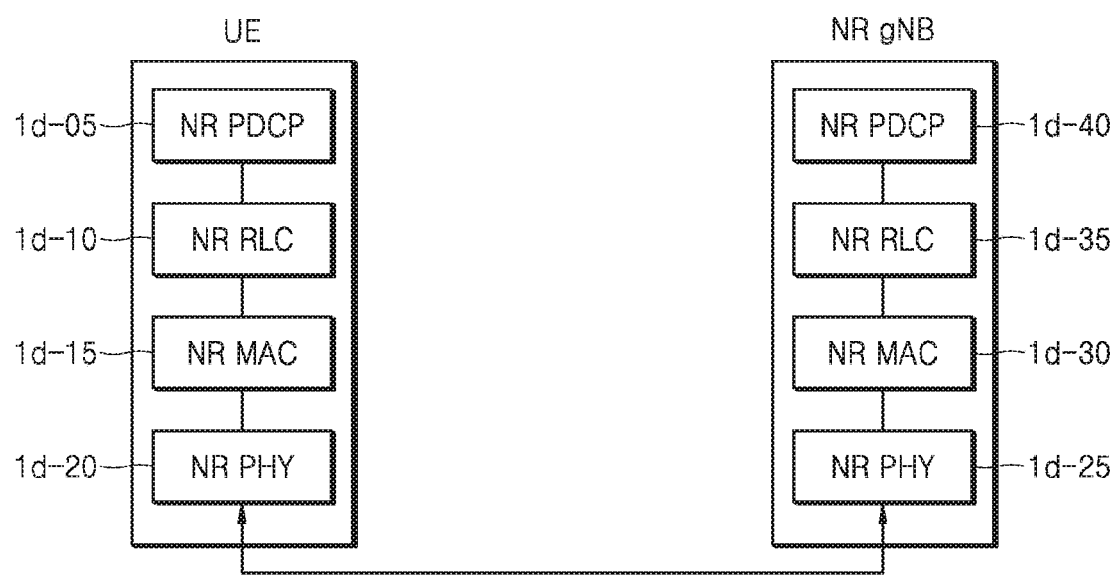
FIG. 1D is a diagram illustrating a radio protocol architecture of a next-generation mobile communication system to which an embodiment is applied.

FIG. 1D is a diagram illustrating a radio protocol architecture of a next-generation mobile communication system to which the present disclosure may be applied.

Referring to FIG. 1D, the radio protocol of the next-generation mobile communication system may include NR PDCP 1d-05 and 1d-40, NR RLC 1d-10 and 1d-35, and NR MAC 1d-15 and 1d-30 in a terminal and an NR base station, respectively.

The main functions of the NR PDCP 1d-05 and 1d-40 may include some of the following functions.

Header compression and decompression function (Header compression and decompression: ROHC only)

User data transmission function (Transfer of user data)

Sequential transmission function (In-sequence delivery of upper layer PDUs)

Non-sequential transmission function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

Here, the reordering function of the NR PDCP apparatus may refer to a function of reordering PDCP PDUs received from a lower layer based on PDCP sequence numbers (SNs), may include a function of immediately transmitting data to an upper layer in the reordered sequence or without considering the sequence, may include a function of reordering the sequence and recording lost PDCP PDUs, may include a function of reporting the state of lost PDCP PDUs to a transmitting side, and may include a function of requesting retransmission of lost PDCP PDUs.

The main functions of the NR RLC 1d-10 and 1d-35 may include some of the following functions.

Data transmission function (Transfer of upper layer PDUs)

Sequential transmission function (In-sequence delivery of upper layer PDUs)

Non-sequential transmission function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

Here, the sequential transmission function (in-sequence delivery) of the NR RLC apparatus may refer to a function of sequentially transmitting RLC SDUs received from a lower layer to an upper layer, may include a function of, when one original RLC SDU is segmented into several RLC SDUs and then received, reassembling and transmitting the same, may include a function of reordering the received RLC PDUs based on RLC SNs or PDCP SNs, may include a function of reordering the sequence and recording lost RLC PDUs, may include a function of reporting the state of lost RLC PDUs to a transmitting side, may include a function of requesting retransmission of lost RLC PDUs, may include a function of, when there is a lost RLC SDU, sequentially transmitting only RLC SDUs up to before the lost RLC SDU to an upper layer, may include a function of, although there is a lost RLC SDU, when a certain timer has expired, sequentially transmitting all RLC SDUs received before the timer starts, to an upper layer, and may include a function of, although there is a lost RLC SDU, when a certain timer has expired, sequentially transmitting all RLC SDUs received until now, to an upper layer. In this case, the RLC PDUs may be processed in order of reception (in order of arrival regardless of the order of sequence numbers) and then transmitted to the PDCP apparatus regardless of the sequence (out-of-sequence delivery), and in the case of segments, the segments stored in the buffer or to be received later may be received, reconfigured into one complete RLC PDU, and then processed and transmitted to the PDCP apparatus. The NR RLC layer may not include the concatenation function, and this function may be performed in the NR MAC layer or may be replaced with the multiplexing function of the NR MAC layer.

Here, the non-sequential transmission function (out-of-sequence delivery) of the NR RLC apparatus may refer to a function of immediately transmitting RLC SDUs received from a lower layer to an upper layer regardless of the sequence, may include a function of, when one original RLC SDU is segmented into several RLC SDUs and then received, reassembling and transmitting the same, and may include a function of storing the RLC SN or PDCP SN of received RLC PDUs, ordering the sequence, and recording lost RLC PDUs.

The NR MACs 1d-15 and 1d-30 may be connected to several NR RLC entities configured in one terminal, and the main functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

NR PHY layers 1b-20 and 1b-25 may channel-code and modulate upper layer data, generate OFDM symbols, and transmit the same through wireless channels or may demodulate and channel-decode OFDM symbols received through wireless channels and transmit the result thereof to the upper layer.

In a wireless communication system, a downlink may secure more transmission resources by using a high frequency band and by using a wide bandwidth. Also, because a beamforming gain and a high signal strength may be obtained by installing more antennas therein, a base station may carry and transmit more data on the same frequency/time resource through the downlink to a terminal. However, in the case of an uplink, because the terminal has a small size and it is difficult to use a high frequency band and a wide bandwidth for uplink frequencies, uplink transmission resources may cause a bottleneck in comparison with downlink transmission resources. Also, because the maximum transmission power of the terminal is much smaller than that of the base station, the coverage thereof may be reduced in uplink data transmission.

When uplink data is compressed and transmitted, more data may be carried and transmitted on the same transmission resources and the coverage may be improved. Also, when data is compressed and transmitted in the downlink as well as the uplink, more data may be carried and transmitted on the same transmission resources and the coverage may also be improved. However, because a process of compressing and decompressing data has a high complexity, it may cause a transmission delay due to the processing time.

The present disclosure describes a method and apparatus for reducing a transmission delay in a wireless communication system when a terminal compresses and transmits data on an uplink and a base station receives and decompresses the data. This may also be applied to a downlink as well as the uplink. That is, this method and apparatus may be used to reduce a transmission delay when the base station compresses and transmits data on the downlink and the terminal receives and decompresses the data. According to an embodiment, by compressing and transmitting data at a transmitting end and receiving and decompressing the data at a receiving end, the transmission delay thereof may be reduced with the effect of allowing more data to be transmitted and improving the coverage thereof.

Figure 1E:
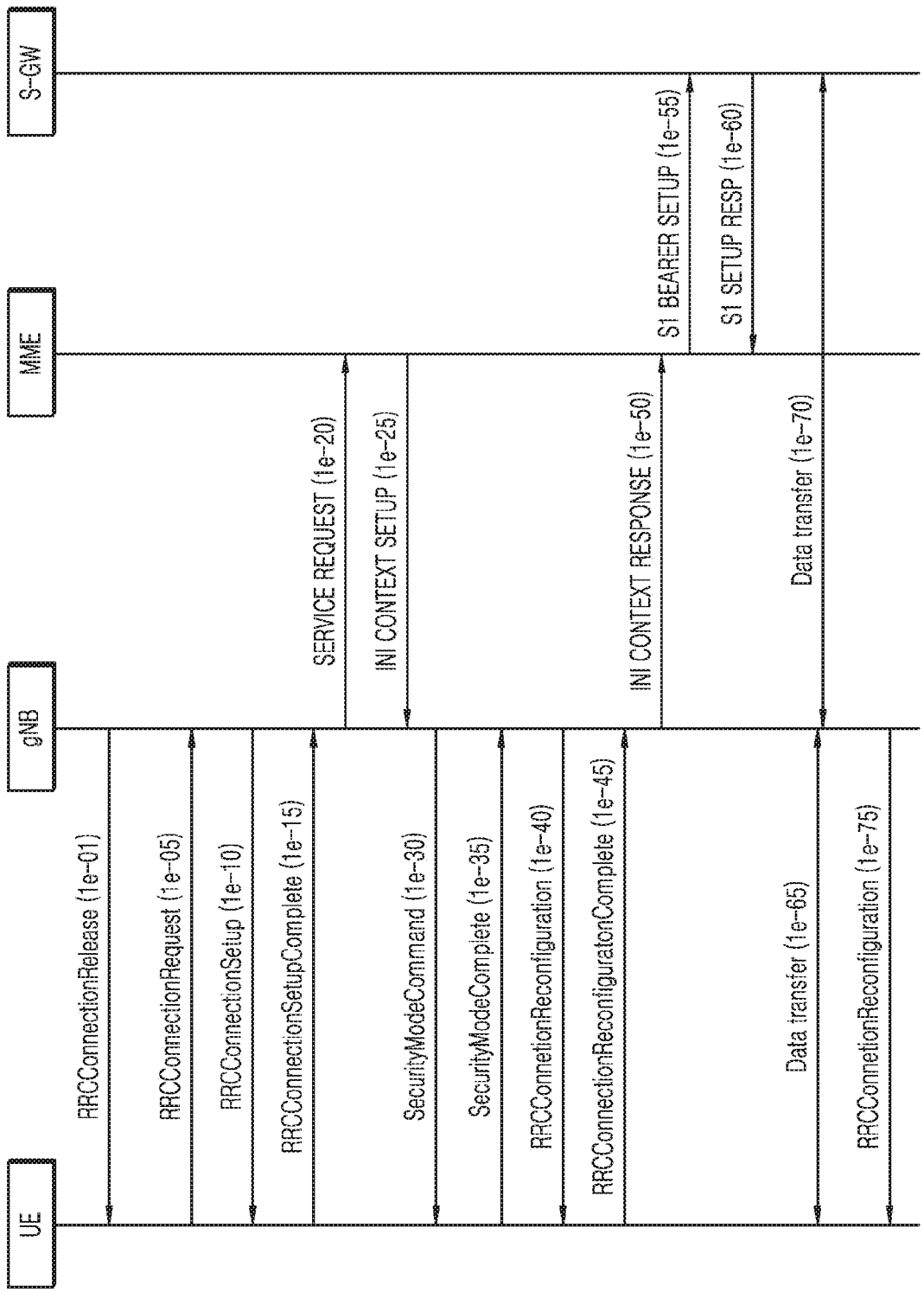
FIG. 1E is a diagram illustrating a procedure of configuring whether a base station is to perform uplink data compression when a terminal establishes a connection with a network, according to an embodiment.

FIG. 1E is a diagram illustrating a procedure of configuring whether a base station is to perform uplink data compression when a terminal establishes a connection with a network, according to an embodiment.

FIG. 1E illustrates a procedure of establishing, by a terminal, a connection with a network by switching from an RRC idle mode or an RRC inactive mode (or a lightly-connected mode) to an RRC connected mode and a procedure of configuring whether to perform uplink data compression (UDC), in an embodiment.

Referring to FIG. 1E, when a terminal transmitting/receiving data in an RRC connected mode does not transmit/receive data for a certain reason or for a certain time, a base station may transmit an RRCConnectionRelease message to the terminal to switch the terminal to an RRC idle mode (1e-01). Thereafter, when data to be transmitted occurs, the terminal (hereinafter, an idle mode UE) that is not currently configured for connection may perform an RRC connection establishment process with the base station. The terminal may establish reverse transmission synchronization with the base station through a random access process and transmit an RRCConnectionRequest message to the base station (1e-05). The RRCConnectionRequest message may include an identifier of the terminal and a reason for establishing the connection (establishmentCause).

The base station may transmit an RRCConnectionSetup message such that the terminal may establish an RRC connection (1e-10). The RRCConnectionSetup message may include information indicating whether to use a UDC method for each logical channel (logicalchannelconfig), for each bearer, or for each PDCP apparatus (PDCP-config). Also, more particularly, the RRCConnectionSetup message may indicate whether to use the UDC method only for a certain IP flow or a certain QoS flow in each logical channel or bearer or each PDCP apparatus (or an SDAP apparatus) (Information about an IP flow or a QoS flow to use or not to use the UDC method may be configured to the SDAP apparatus and thus the SDAP apparatus may indicate to the PDCP apparatus whether to use the UDC method for each QoS flow, or the PDCP apparatus may identify each QoS flow by itself (based on the configuration information configured by the base station) and determine whether to apply the UDC method). In this case, when it is indicated that the UDC method is to be used, an identifier of a predefined library or dictionary to be used in the UDC method, a buffer size to be used in the UDC method, or the like may be indicated. Also, the RRCConnectionSetup message may include a command for configuration (also referred to as setup) or release to perform uplink decompression. Herein, when the UDC method is configured to be used, it may always be configured to an RLC AM bearer mode (a lossless mode due to an ARQ function or a retransmission function) and may not be configured together with the header compression protocol (ROHC). Also, the RRCConnectionSetup message may include RRC connection configuration information or the like. The RRC connection may also be referred to as a signaling radio bearer (SRB) and may be used to transmit/receive an RRC message that is a control message between the terminal and the base station.

Upon establishing the RRC connection, the terminal may transmit an RRCConnetionSetupComplete message to the base station (1e-15). When not knowing the terminal capability for the terminal that is currently establishing a connection or when wanting to know the terminal capability, the base station may transmit a message for asking the capability of the terminal. Then, the terminal may transmit a message for reporting its capability. This message may indicate whether the terminal may use the UDC method, and may include an indicator indicating the same. The RRCConnetionSetupComplete message may include a control message "SERVICE REQUEST" for the terminal to request an MME to configure a bearer for a certain service.

The base station may transmit the SERVICE REQUEST message included in the RRCConnetionSetupComplete message to the MME (1e-20), and the MME may determine whether to provide the service requested by the terminal. Upon determining to provide the service requested by the terminal, the MME may transmit an INITIAL CONTEXT SETUP REQUEST message to the base station (1e-25). The INITIAL CONTEXT SETUP REQUEST message may include information such as QoS information to be applied when configuring a data radio bearer (DRB) and security-related information (e.g., security key and security algorithm) to be applied to the DRB. The base station may exchange a SecurityModeCommand message (1e-30) and a SecurityModeComplete message (1e-35) with the terminal to configure security.

Upon completion of the security configuration, the base station may transmit an RRCConnectionReconfiguration message to the terminal (1e-40). The RRCConnectionReconfiguration message may include information indicating whether to use a UDC method for each logical channel (logicalchannelconfig), for each bearer, or for each PDCP apparatus (PDCP-config). Also, more particularly, the RRCConnectionReconfiguration message may indicate whether to use the UDC method only for a certain IP flow or a certain QoS flow in each logical channel or bearer or each PDCP apparatus (or an SDAP apparatus) (Information about an IP flow or a QoS flow to use or not to use the UDC method may be configured to the SDAP apparatus and thus the SDAP apparatus may indicate to the PDCP apparatus whether to use the UDC method for each QoS flow, or the PDCP apparatus may identify each QoS flow by itself (based on the configuration information configured by the base station) and determine whether to apply the UDC method). In this case, when it is indicated that the UDC method is to be used, an identifier of a predefined library or dictionary to be used in the UDC method, a buffer size to be used in the UDC method, or the like may be indicated. Also, the RRCConnectionReconfiguration message may include a command for configuration or release to perform uplink decompression. Herein, when the UDC method is configured to be used, it may always be configured to an RLC AM bearer mode (a lossless mode due to an ARQ function or a retransmission function) and may not be configured together with the header compression protocol (ROHC). Also, the RRCConnectionReconfiguration message may include configuration information of the DRB where user data is to be processed, and the terminal may apply the configuration information to configure the DRB and transmit an RRCConnectionReconfigurationComplete message to the base station (1e-45).

Upon completing the DRB configuration with the terminal, the base station may transmit an INITIAL CONTEXT SETUP COMPLETE message to the MME (1e-50), and upon receiving the same, the MME may exchange an S1 BEARER SETUP message and an S1 BEARER SETUP RESPONSE message with an S-GW to configure an S1 bearer (1e-55 and 1e-60). The S1 bearer may be a data transmission connection established between the S-GW and the base station and may correspond one-to-one to the DRB.

When all of these processes are completed, the terminal may exchange data with the base station through the S-GW (1e-65 and 1e-70). The above data transmission process may generally include three operations of RRC connection configuration, security configuration, and DRB configuration. Also, the base station may transmit an RRCConnectionReconfiguration message to the terminal to update, add, or change the configuration for a certain reason (1e-75). The RRCConnectionReconfiguration message may include information indicating whether to use a UDC method for each logical channel (logicalchannelconfig), for each bearer, or for each PDCP apparatus (PDCP-config). Also, more particularly, the RRCConnectionReconfiguration message may indicate whether to use the UDC method only for a certain IP flow or a certain QoS flow in each logical channel or bearer or each PDCP apparatus (or an SDAP apparatus) (Information about an IP flow or a QoS flow to use or not to use the UDC method may be configured to the SDAP apparatus and thus the SDAP apparatus may indicate to the PDCP apparatus whether to use the UDC method for each QoS flow, or the PDCP apparatus may identify each QoS flow by itself (based on the configuration information configured by the base station) and determine whether to apply the UDC method). In this case, when it is indicated that the UDC method is to be used, an identifier of a predefined library or dictionary to be used in the UDC method, a buffer size to be used in the UDC method, or the like may be indicated. Also, the RRCConnectionReconfiguration message may include a command for configuration or release to perform uplink decompression. Herein, when the UDC method is configured to be used, it may always be s configured to an RLC AM bearer mode (a lossless mode due to an ARQ function or a retransmission function) and may not be configured together with the header compression protocol (ROHC).

In the above process, it may be possible to indicate whether to use the UDC method only for a certain IP flow or a certain QoS flow in each logical channel or bearer or each PDCP apparatus (or an SDAP apparatus). For example, the base station may use an RRC message (an AS message) or a core network may use an NAS message to configure an indicator or information about an IP flow or a QoS flow to use or not to use the UDC method to the SDAP apparatus and thus the SDAP apparatus may use the indicator to indicate to the PDCP apparatus whether to use the UDC method for each QoS flow, or the PDCP apparatus may identify each QoS flow by itself (based on the indicator or the configuration information configured by the base station or the core network) and determine whether to apply the UDC method, or the base station or the core network may configure traffic flow template (TFT) filtering information including an UDC application/non-application indicator to the terminal and thus a terminal PDCP entity may determine application/non-application of UDC for each packet.

Figure 1F:
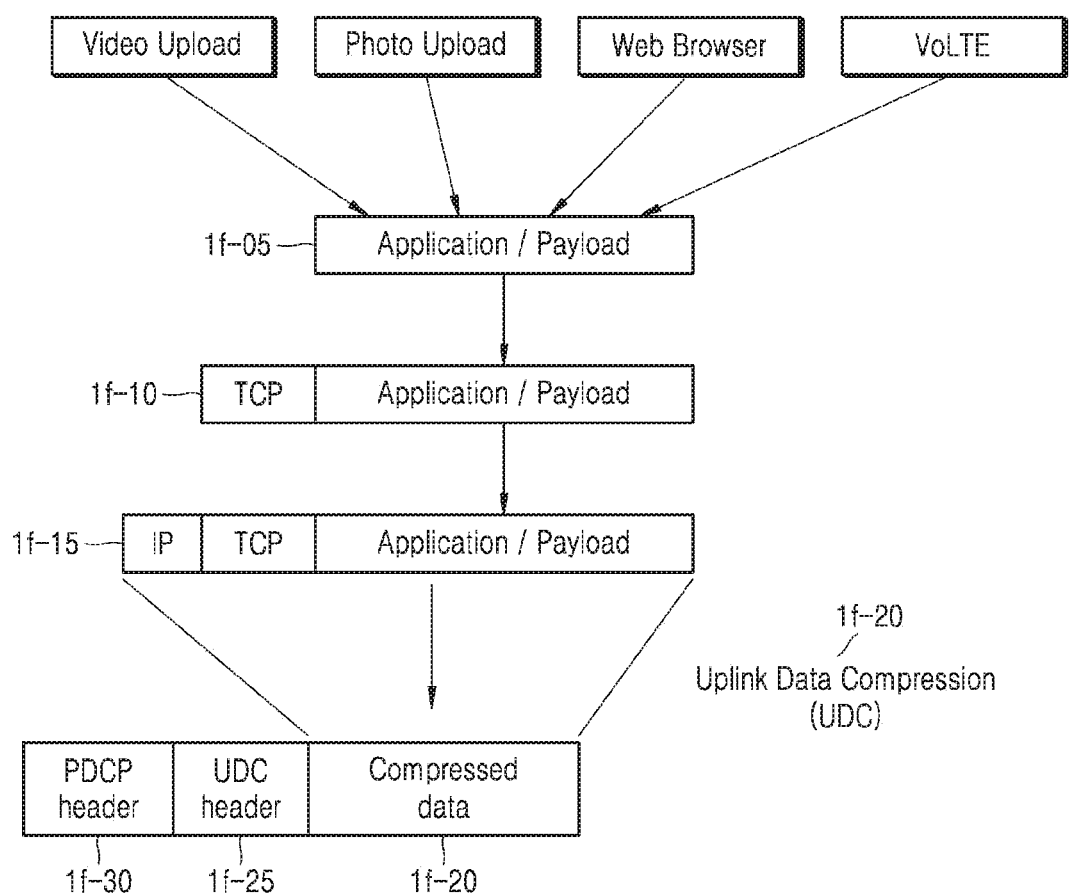
FIG. 1F is a diagram illustrating a data configuration and a procedure of performing uplink data compression, according to an embodiment.

FIG. 1F is a diagram illustrating a data configuration and a procedure of performing uplink data compression, according to an embodiment.

In FIG. 1F, uplink data 1f-05 may be generated as data corresponding to services such as video transmission, picture transmission, Web search, and VoLTE. Data generated by an application layer may be processed through TCP/IP or UDP corresponding to a network data transmission layer, may configure respective headers 1f-10 and 1f-15, and may be transmitted to a PDCP layer. Upon receiving data (PDCP SDU) from an upper layer, the PDCP layer may perform the following procedure.

In FIG. 1F, when the PDCP layer is configured to use a UDC method according to an RRC message such as 1e-10, 1e-40, or 1e-75, the UDC method may be performed on the PDCP SDU as in 1f-20 to perform compression on the uplink data, configure a UDC header (a header for compressed uplink data) 1f-25 corresponding thereto, perform ciphering, perform integrity protection when configured, and configure a PDCP header 1f-30 to configure a PDCP PDU. A PDCP entity may include a UDC compressor/decompressor, and may determine whether to perform a UDC procedure on each data as configured in the RRC message and use the UDC compressor/decompressor. At a transmitting end, a transmitting PDCP entity may perform data compression by using the UDC compressor, and at a receiving end, a receiving PDCP entity may perform data decompression by using the UDC decompressor.

The above procedure of FIG. 1F may also be applied to compress downlink data as well as to compress the uplink data by the terminal. Also, the description of the uplink data may be similarly applied to the downlink data.

In FIG. 1F, the UDC header 1f-15 and the PDCP header 1f-30 are described separately; however, both the UDC header and the PDCP header may be configured, generated, and concatenated in the PDCP entity and both the headers may be referred to as a PDCP header. Hereinafter, the UDC header will be described as a portion of the PDCP header.

Figure 1G:
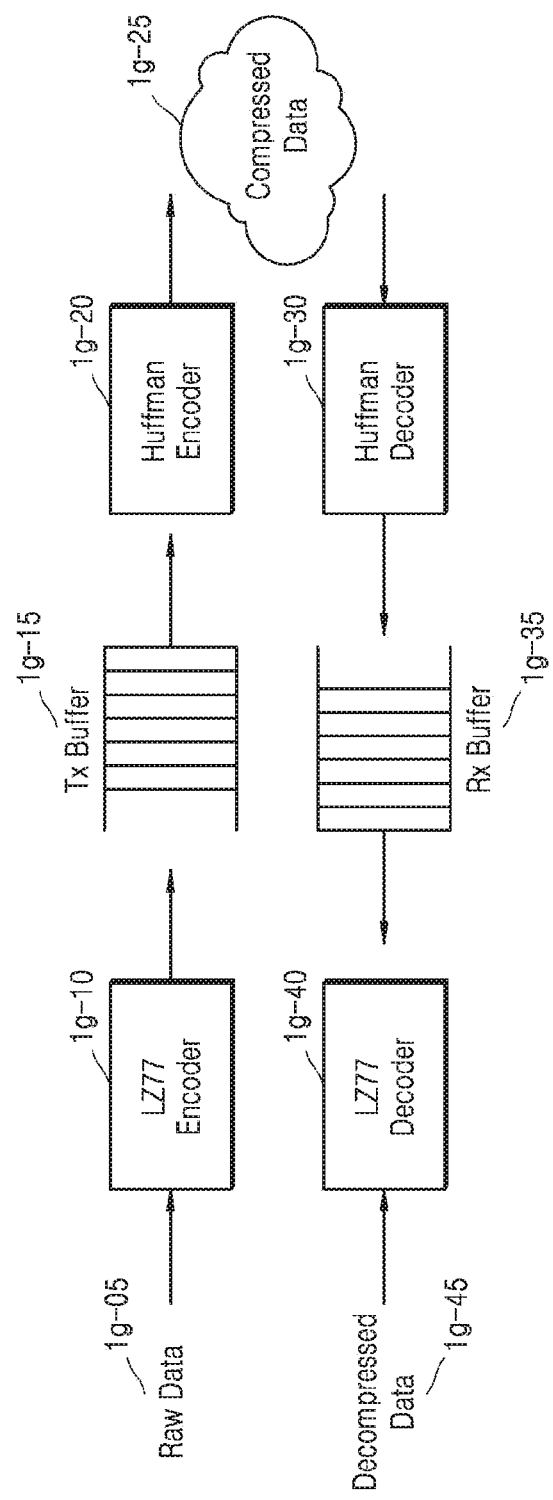
FIG. 1G is a diagram illustrating an uplink data compression method according to an embodiment.

FIG. 1G is a diagram illustrating an uplink data compression method according to an embodiment.

FIG. 1G is a diagram illustrating a description of a DEFLATE-based uplink data compression algorithm, and the DEFLATE-based uplink data compression algorithm is a lossless compression algorithm. The DEFLATE-based uplink data compression algorithm may basically combine an LZ77 algorithm and Huffman coding to compress uplink data.

The LZ77 algorithm may perform an operation of finding a duplicate array of data, and when a duplicate array is found in a sliding window, data compression may be performed by representing the position and the duplicate degree of the duplicate array in the sliding window in length. The sliding window may also be referred to as a buffer in a UDC method and may be configured to 8 kilobytes or 32 kilobytes. That is, the sliding window or buffer may perform compression by writing 8,192 or 32,768 letters, finding a duplicate array, and representing the same in position and length. Thus, because the LZ77 algorithm is a sliding window method, that is, because original data is updated in the buffer before coding of previously coded data and next data is immediately coded, consecutive data may have a correlation therebetween. Thus, the first coded data should be normally decoded so that the next data may be normally decoded.

Codes represented in position and length and compressed by the LZ77 algorithm (representation of position, length, or the like) may be again compressed through the Huffman coding. The Huffman coding may again find duplicate codes and again perform compression by using a short notation for heavily-duplicated codes or frequent codes and using a long notation for lightly-duplicated codes or infrequent codes. The Huffman coding is prefix coding and is an optimal coding scheme in which all codes are uniquely decodable.

As described above, at a transmitting end, the LZ77 algorithm may be applied to raw data (1g-05) to perform encoding (1g-10), update a buffer (1g-15), generate checksum bits for the content (or data) of the buffer, and configure the same in a UDC header. The checksum bits may be used to determine the validity of a buffer state at a receiving end. Codes encoded by the LZ77 algorithm may be again compressed by the Huffman coding and then transmitted as uplink data (1g-25). The receiving end may perform a decompression procedure on the contrary to the transmitting end. That is, the Huffman decoding may be performed (1g-30), the buffer may be updated with the previously-decompressed data (1g-35), and the validity of the updated buffer may be identified by the checksum bits of the UDC header. When it is determined that there is no error in the checksum bits, decoding may be performed by the LZ77 algorithm (1g-40) to decompress the data, restore the raw data, and transmit the same to an upper layer (1g-45).

As described above, because the LZ77 algorithm is a sliding window method, that is, because the previously-coded data is updated in the buffer and the next data is immediately coded, consecutive data may have a correlation therebetween. Thus, the first coded data should be normally decoded so that the next data may be normally decoded. Thus, a receiving PDCP entity may check a PDCP sequence number of a PDCP header, check a UDC header (check an indicator indicating whether data compression has been performed), and perform a data decompression procedure in ascending order of PDCP sequence number on the data to which a data compression procedure has been applied. Thus, when a UDC decompression failure or a checksum failure occurs on a certain PDCP sequence number, an error propagation phenomenon may occur, in which a UDC decompression error occurs in all the data to which UDC has been applied thereafter.

According to an embodiment, a procedure of performing UDC configured to the terminal by the base station and a procedure of performing UDC by the terminal may be as follows.

Referring to FIG. 1E, the base station may configure or release to perform UDC on a bearer or a logical channel in which an RLC AM mode is configured to the terminal via an RRC message such as 1e-10, 1e-40, or 1e-75 in FIG. 1E. Also, the RRC message may be used to configure whether to perform UDC for each bearer, for each logical channel, or for each PDCP entity, and more particularly, it may be used to configure whether to perform UDC for each IP flow (or QoS flow) in one bearer, logical channel, or PDCP entity. Herein, the configuration for each QoS flow may configure an indicator or information in the PDCP entity to indicate which QoS flow is to perform uplink data decompression and which QoS flow is not to perform uplink data decompression. Also, herein, the configuration for each QoS flow may be configured to the SDAP entity instead of the PDCP entity, so that the SDAP entity may indicate the PDCP entity whether to perform uplink data decompression for each QoS flow when each QoS flow is mapped to each bearer.

Figure 1H:
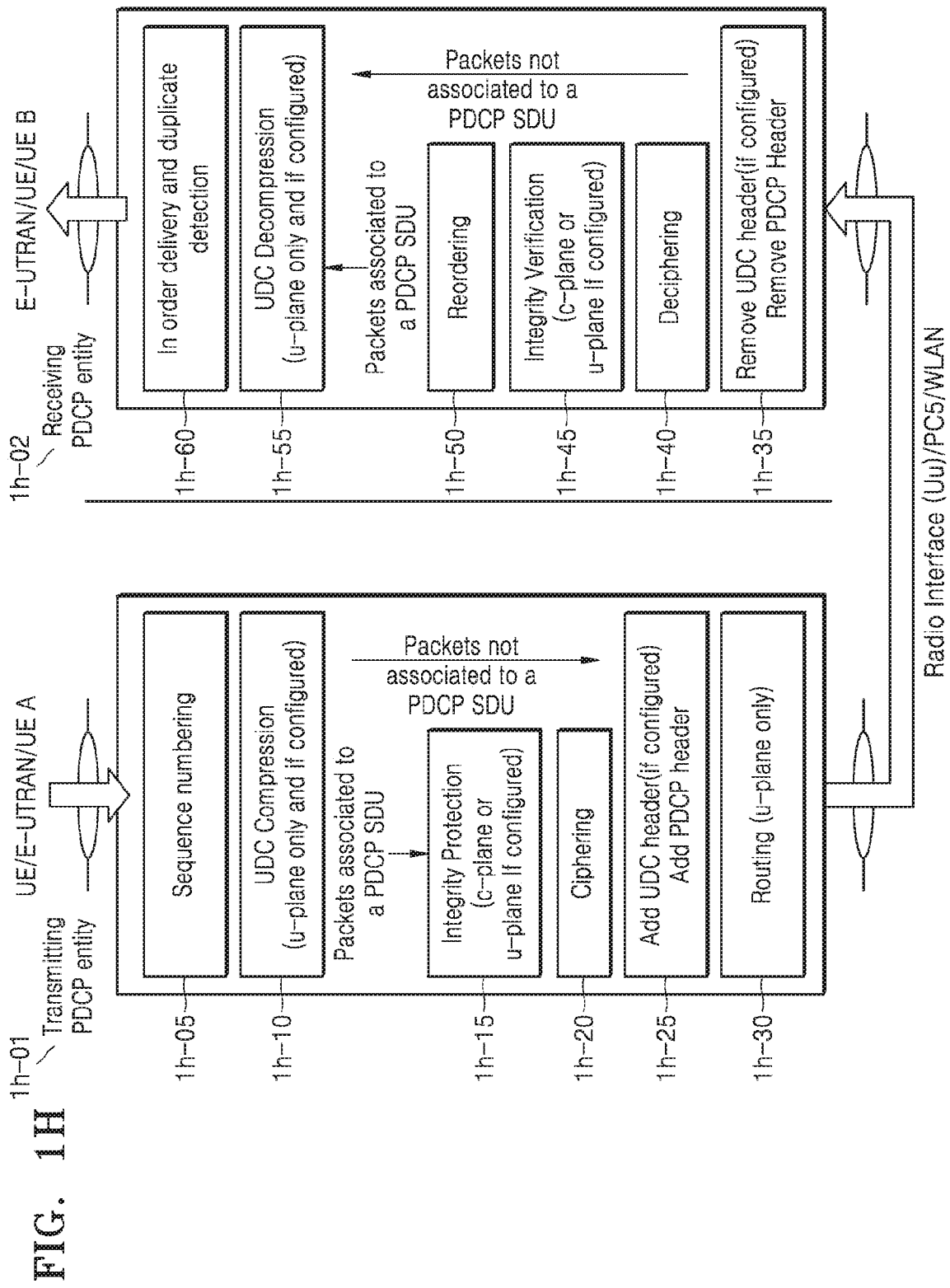
FIG. 1H is a diagram illustrating a process in which a transmitting packet data convergence protocol (PDCP) entity performs uplink data compression (UDC) and transmission and a receiving PDCP entity performs decompression on data resulting from the UDC and transmits the decompressed data to an upper layer, according to an embodiment.

FIG. 1H is a diagram illustrating a process in which a transmitting PDCP entity performs UDC and transmission and a receiving PDCP entity decompresses data resulting from the UDC and transmits the decompressed data to an upper layer, according to an embodiment.

Referring to FIG. 1H, when configured to perform UDC on a certain bearer, logical channel, or PDCP entity (or on certain QoS flows of a certain bearer, logical channel, or PDCP entity) via an RRC message, a transmitting PDCP entity 1h-01 may reset a buffer in a UDC apparatus of the PDCP entity according to the corresponding configuration and prepare a UDC procedure. Then, upon receiving data from an upper layer (PDCP SDU), the transmitting PDCP entity 1h-01 may allocate PDCP sequence numbers to the received data in order of reception (1h-05). When it is configured to perform UDC, it may perform UDC on the received data (1h-10). When it is configured to be perform UDC only on particular QoS flows of the PDCP entity, it may check a QoS flow identifier or an indication of an upper SDAP layer, determine whether to perform UDC, and perform UDC. Then, when UDC is performed and the buffer is updated for data compression, a UDC buffer may be configured. In this case, when UDC is performed, the PDCP SDU received from the upper layer may be compressed into UDC compressed data (UDC block) having a smaller size. Then, when integrity protection is configured for the transmitting PDCP entity 1h-01, integrity protection may be applied to the UDC compressed data (1h-15) and ciphering may be performed thereon by using a security key (1h-20).

Then, a UDC header for the ciphered UDC compressed data may be configured (1h-25). The UDC header may include an indicator indicating whether UDC has been performed (e.g., the UDC header may include a 1-bit indicator; and when the indicator is 0, UDC may be applied, and when the indicator is 1, UDC may not be applied). When UDC is not applied, because compression has already been performed in the upper layer, even when a UDC procedure is performed in the PDCP entity, a compression rate thereof may be very low and only a transmitting end processing load due to a compression procedure may increase. Alternatively, because a PDCP SDU data structure received from the upper layer does not have a repetitive data structure, data compression may not be performed by the above UDC compression method (DEFLATE algorithm) or a data compression rate thereof may be significantly low. When UDC is performed on the data received from the upper layer (PDCP SDU) and the UDC buffer is updated, checksum bits may be calculated to allow the receiving PDCP entity to check the validity of the updated UDC buffer and the UDC header may be configured to include the checksum bits (the checksum bits may have a certain length and may include, for example, 4 bits).

As for the ciphered UDC compressed data, a UDC header may be configured and concatenated to a front portion thereof as described above, a PDCP header may be configured with the PDCP sequence number allocated in 1h-05, the PDCP header may be concatenated to the front of the UDC header, and the result thereof may be transmitted to a lower layer in order of PDCP sequence number (1h-30).

When a receiving PDCP entity 1h-02 receives the PDCP PDU transmitted from the transmitting PDCP entity 1h-01, it may first read the PDCP header, identify the PDCP sequence number, and remove the PDCP header (1h-35). Then, when the UDC procedure is configured for the PDCP entity, it may read the UDC header, check the indicator indicating whether UDC is applied by the transmitting PDCP entity 1h-01, and check a checksum field of the UDC header to calculate a checksum and check whether a checksum failure or error occurs. Whether UDC is applied or whether the UDC header exists may be checked by a 1-bit indicator of the PDCP header.

When there is no checksum error of the UDC header, the UDC header may be removed, the ciphered UDC compressed data may be deciphered by using the security key (1h-40), and integrity verification may be performed when integrity protection is configured in the PDCP entity (1h-45). The PDCP sequence numbers of the received data may be stored by checking the PDCP header in operation 1h-35. In the LTE system, in the case of an LTE RLC entity, it may always transmit data to a PDCP entity in sequence. However, when an RLC layer is re-established in an environment such as handover, unordered data may be transmitted to the PDCP entity. Alternatively, when a split bearer is configured, unordered data may be transmitted to the PDCP entity. Also, in the NR system, an NR RLC entity may not always order the sequence and may transmit the processed data to the PDCP entity regardless of the sequence. Thus, as in operation 1h-50, the received data may need to be reordered in order of PDCP sequence number. The reordering function may include ordering the received data in ascending order of PDCP sequence number such that there may be no sequence number lost in the middle, no sequence number not yet received, or no sequence number gap, a UDC decompression procedure may be performed in ascending order of PDCP sequence number according to the application/non-application of UDC checked in the UDC header (or PDCP header) in operation 1h-35 (1h-55). The UDC decompression procedure may not be performed on the data to which UDC is not applied. Then, the data processed in ascending order of PDCP sequence number without PDCP sequence numbers lost in the middle may be transmitted to the upper layer in ascending order of PDCP sequence number (1h-60).

The reordering function may be important because no error occurs only when UDC decompression is applied to the UDC-applied data in order of UDC application as described in FIG. 1G. For example, when UDC is applied in the transmitting PDCP entity in the order of PDCP sequence numbers 1, 2, 4, and 7, UDC decompression should also be performed in the order of PDCP sequence numbers 1, 2, 4, and 7 in the receiving PDCP entity. In this case, UDC may not be applied with respect to PDCP sequence numbers 3, 5, and 6.

In the above embodiment, when integrity verification is configured only for the upper layer data or the UDC data block except the UDC header by using the security key, ciphering may be performed after application of integrity verification. As such, when integrity verification is configured only for the upper layer data or the UDC data block except the UDC header by using the security key, when integrity verification is performed and then ciphering is performed, the receiving PDCP entity may read the PDCP header and then read the UDC header without performing deciphering. Thus, when a received UDC buffer value and a checksum field are calculated by checking the checksum field of the UDC header and a checksum error occurs as a result thereof, it may not be necessary to perform deciphering on the UDC data block in which an error occurs. According to an embodiment, the processing complexity and the processing load may be reduced in the receiving PDCP entity.

As described above, the base station may configure or release to perform UDC on a bearer or a logical channel in which an RLC AM mode is configured to the terminal via an RRC message such as 1e-10, 1e-40, or 1e-75 in FIG. 1E. Also, the RRC message may be used to configure whether to perform UDC for each bearer, for each logical channel, or for each PDCP entity, and more particularly, it may be used to configure whether to perform UDC for each IP flow (or QoS flow) in one bearer, logical channel, or PDCP entity. Herein, the configuration for each QoS flow may configure an indicator or information in the PDCP entity to indicate which QoS flow is to perform uplink data decompression and which QoS flow is not to perform uplink data decompression. Also, herein, the configuration for each QoS flow may be configured to the SDAP entity instead of the PDCP entity, so that the SDAP entity may indicate the PDCP entity whether to perform uplink data decompression for each QoS flow when each QoS flow is mapped to each bearer.

FIG. 1I is a diagram illustrating a process in which a transmitting PDCP entity performs UDC and transmission and a receiving PDCP entity decompresses data resulting from the UDC and transmits the decompressed data to an upper layer, according to another embodiment.

Referring to FIG. 1I, when configured to perform UDC on a certain bearer, logical channel, or PDCP entity (or on certain QoS flows of a certain bearer, logical channel, or PDCP entity) via an RRC message, a transmitting PDCP entity 1i-01 may reset a buffer in a UDC apparatus of the PDCP entity according to the corresponding configuration and prepare a UDC procedure. Then, upon receiving data from an upper layer (PDCP SDU), the transmitting PDCP entity 1i-01 may allocate PDCP sequence numbers to the received data in order of reception (1i-05). When it is configured to perform UDC, it may perform UDC on the received data (1i-10). When it is configured to be perform UDC only on particular QoS flows of the PDCP entity, it may check a QoS flow identifier or an indication of an upper SDAP layer, determine whether to perform UDC, and perform UDC. Then, when UDC is performed and the buffer is updated for data compression, a UDC buffer may be configured. In this case, when UDC is performed, the PDCP SDU received from the upper layer may be compressed into UDC compressed data (UDC block) having a smaller size.

Then, a UDC header for the ciphered UDC compressed data may be configured (1i-15). The UDC header may include an indicator indicating whether UDC has been performed (e.g., the UDC header may include a 1-bit indicator; and when the indicator is 0, UDC may be applied, and when the indicator is 1, UDC may not be applied). When UDC is not applied, because compression has already been performed in the upper layer, even when a UDC procedure is performed in the PDCP entity, a compression rate thereof may be very low and only a transmitting end processing load due to a compression procedure may increase. Alternatively, because a PDCP SDU data structure received from the upper layer does not have a repetitive data structure, data compression may not be performed by the above UDC compression method (DEFLATE algorithm) or a data compression rate thereof may be significantly low. When UDC is performed on the data received from the upper layer (PDCP SDU) and the UDC buffer is updated, checksum bits may be calculated to allow the receiving PDCP entity to check the validity of the updated UDC buffer and the UDC header may be configured to include the checksum bits (the checksum bits may have a certain length and may include, for example, 4 bits).

As for the ciphered UDC compressed data, a UDC header may be configured and concatenated to a front portion thereof as described above, and when integrity protection is configured for the transmitting PDCP entity 1i-01, integrity protection may be applied to the UDC header and the UDC compressed data (1i-20) and ciphering may be performed thereon by using a security key (1i-25).

As for the ciphered data, a PDCP header may be configured with the PDCP sequence number allocated in 1i-05 (1i-30), the PDCP header may be concatenated to the front of the ciphered data, and the result thereof may be transmitted to a lower layer in order of PDCP sequence number (1i-35).

When a receiving PDCP entity 1i-02 receives the PDCP PDU transmitted from the transmitting PDCP entity 1i-01, it may first read the PDCP header, identify the PDCP sequence number, and remove the PDCP header (1i-40).

Then, the ciphered data resulting from the removal of the PDCP header may be deciphered by using the security key (1i-45), and integrity verification may be performed when integrity protection is configured in the PDCP entity (1i-50). The PDCP sequence numbers of the received data may be stored by checking the PDCP header in operation 1i-40. In the LTE system, in the case of an LTE RLC entity, it may always transmit data to a PDCP entity in sequence. However, when an RLC layer is re-established in an environment such as handover, unordered data may be transmitted to the PDCP entity. Also, in the NR system, an NR RLC entity may not always order the sequence and may transmit the processed data to the PDCP entity regardless of the sequence. Thus, as in operation 1i-55, it may be necessary to perform reordering in order of PDCP sequence number. The reordering function may include ordering the received data in ascending order of PDCP sequence number such that there may be no sequence number lost in the middle, no sequence number not yet received, or no sequence number gap, and the data may be processed in order of PDCP sequence number without PDCP sequence numbers lost in the middle. When the UDC procedure is configured for the PDCP entity, it may read the UDC header, check the indicator indicating whether UDC is applied by the transmitting PDCP entity 1i-01, and check a checksum field of the UDC header to calculate a checksum and check whether a checksum failure or error occurs. Whether UDC is applied or whether the UDC header exists may be checked by a 1-bit indicator of the PDCP header.

When a checksum error of the UDC header has not occurred, the UDC header may be removed (1i-60) and a UDC decompression procedure may be performed according to the application/non-application of UDC checked in the UDC header (or PDCP header) (1i-65). The UDC decompression procedure may not be performed on the data to which UDC is not applied. Then, the data processed in ascending order of PDCP sequence number without PDCP sequence numbers lost in the middle may be transmitted to the upper layer in ascending order of PDCP sequence number (1i-70).

The reordering function may be important because no error occurs only when UDC decompression is applied to the UDC-applied data in order of UDC application as described in FIG. 1G. For example, when UDC is applied in the transmitting PDCP entity in the order of PDCP sequence numbers 1, 2, 4, and 7, UDC decompression should also be performed in the order of PDCP sequence numbers 1, 2, 4, and 7 in the receiving PDCP entity. In this case, UDC may not be applied with respect to PDCP sequence numbers 3, 5, and 6.

In the above embodiment, when integrity verification is configured for the UDC header or the entire UDC data block by using the security key, ciphering may be performed after application of integrity verification. As such, when ciphering is performed on the UDC header and the entire UDC data block by using the security key, because UDC compression and UDC header configuration may be bundled into a series of processes in terms of the implementation of the transmitting PDCP entity, a function for UDC processing may be implemented separately and thus may be easily implemented.

In the above embodiments, when the base station configures the transmitting PDCP entity to apply UDC, particularly when it indicates to the SDAP entity, the PDCP entity, or the TFT to apply or not to apply UDC for a particular IP flow through the configuration information; when there is no repetitive structure in data about the IP flow when UDC is applied to the IP flow, for example when a repetitive structure is not found in the data to which UDC is to be applied when the LZ77 coding described in FIG. 1G is applied, the transmitting PDCP entity may skip UDC application and configure an indicator indicating non-application of UDC configuration in the UDC header. As such, when the compression ratio is expected to decrease significantly even when UDC application is performed, the transmitting PDCP entity may skip the UDC application and the receiving PDCP entity may skip the UDC decompression procedure to reduce the processing load in the transmitting PDCP entity and the receiving PDCP entity.

The above UDC procedure may be similarly applied to downlink data, and the efficiency of transmission resources may be increased and the transmission delay may be reduced by compressing data to be transmitted. However, a procedure of compressing data in the transmitting PDCP entity and a procedure of decompressing data in the receiving PDCP entity may have high complex, consume a lot of processing power, and require a long processing time.

The following proposes a parallel processing method of the UDC procedure in the transmitting PDCP entity and the receiving PDCP entity that may reduce the processing time.

Figure 1J:
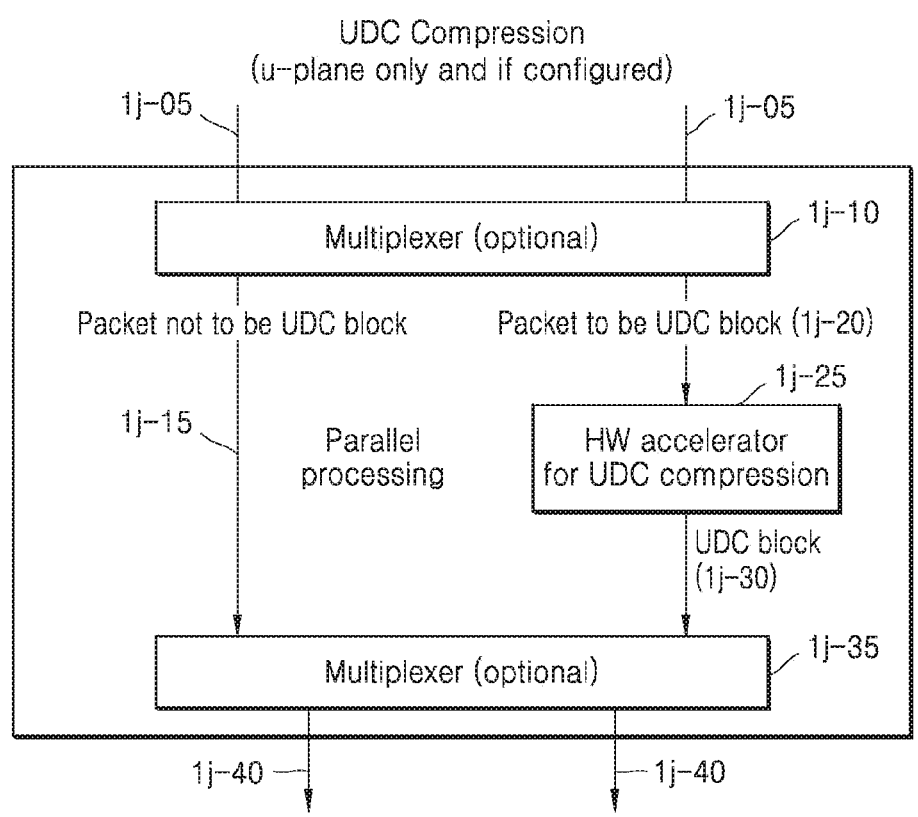
FIG. 1J is a diagram illustrating a parallel processing method for data to which UDC is to be applied and data to which UDC is not to be applied, in a transmitting PDCP entity, according to an embodiment.

FIG. 1J is a diagram illustrating a parallel processing method for data to which UDC is to be applied and data to which UDC is not to be applied in a transmitting PDCP entity, according to an embodiment.

FIG. 1J illustrates a UDC parallel processing method of the transmitting PDCP entity applicable to the transmitting PDCP entities (1h-10 and 1i-10) described in FIGS. 1H and 1I.

Referring to FIG. 1J, upon receiving data from an upper layer, the transmitting PDCP entity may allocate PDCP sequence numbers to the received data in order of reception and determine whether to apply UDC to the received data. Whether to apply UDC to the received data may be indicated by the upper layer (SDAP layer, TFT filter, or RRC configuration information), or the PDCP entity may distinguish IP flows based on the configuration information and then it may be determined by a multiplexer 1j-10. Upon receiving a series of data, the transmitting PDCP entity may determine whether to apply the UDC, and the multiplexer 1j-10 may not perform a UDC procedure on data to which UDC is not to be applied for parallel processing and may transmit the same for a next data processing procedure (1j-15 and 1j-40). For example, operation 1h-15 of FIG. 1H or operation 1i-15 of FIG. 1I may be immediately applied.

The multiplexer 1j-10 may convert data to which UDC is to be applied for parallel processing into a compressed UDC block by applying a UDC procedure (1j-25 and 1j-30). A hardware accelerator 1j-25 may be applied to this UDC procedure. The hardware accelerator 1j-25 may be a separate block in an SOC chip and may be a separate hardware module that is implemented in one modem, has no access to a main CPU, and does not require the processing capability of the main CPU. Also, because the hardware accelerator 1j-25 is very efficient in repetitive and continuous processing, repetitively performing a UDC procedure by continuously applying the hardware accelerator 1j-25 only to data to which UDC is to be applied by distinguishing between data to which UDC is to be applied and data to which UDC is not to be applied as in the multiplexer 1j-10 may be efficient and may reduce the processing time.

Also, as described above, data to which UDC is to be applied and data to which UDC is not to be applied may be distinguished to perform parallel processing. That is, data processing may be performed such that UDC may be applied by the hardware accelerator to data to which UDC is to be applied and simultaneously data to which UDC is not to be applied may proceed immediately to the next processing process in the main CPU. The data to which UDC is applied and the data to which UDC is not applied, which are processed in parallel in operation 1j-40, may proceed to the next data processing operation in parallel at the same time. As another method, the data to which UDC is applied and the data to which UDC is not applied, which are processed in parallel in operation 1j-40, may proceed to the next data processing operation in the order in which data processing is completed first (First In First Out (FIFO)).

That is, in operation 1j-40, it may proceed to a lower data processing operation regardless of the PDCP sequence number. Then, when data is completely processed and then transmitted to a lower layer, it may be reordered in operation 1h-30 of FIG. 1H of Embodiment 1 of the present disclosure or in operation 1i-30 of FIG. 1I of Embodiment 2 of the present disclosure and then may be transmitted in order of PDCP sequence number.

In the above parallel processing method, the multiplexers 1j-10 and 1j-35 may be implemented for multiplexing when necessary and it may be implemented without multiplexing.

In the above embodiments, the hardware accelerator 1j-25 may also be applied to the ciphering, deciphering, integrity protection, and integrity verification procedures. Because ciphering and deciphering are applied to all packets, the processing time may be efficiently reduced by applying the hardware accelerator 1j-25. When integrity protection is also configured, because integrity protection and integrity verification should be applied to all packets of a configured bearer, the processing time may be efficiently reduced by applying the hardware accelerator 1j-25.

The above UDC procedure may cause a transmission delay in the receiving PDCP entity due to complexity and long processing time.

Figure 1K:
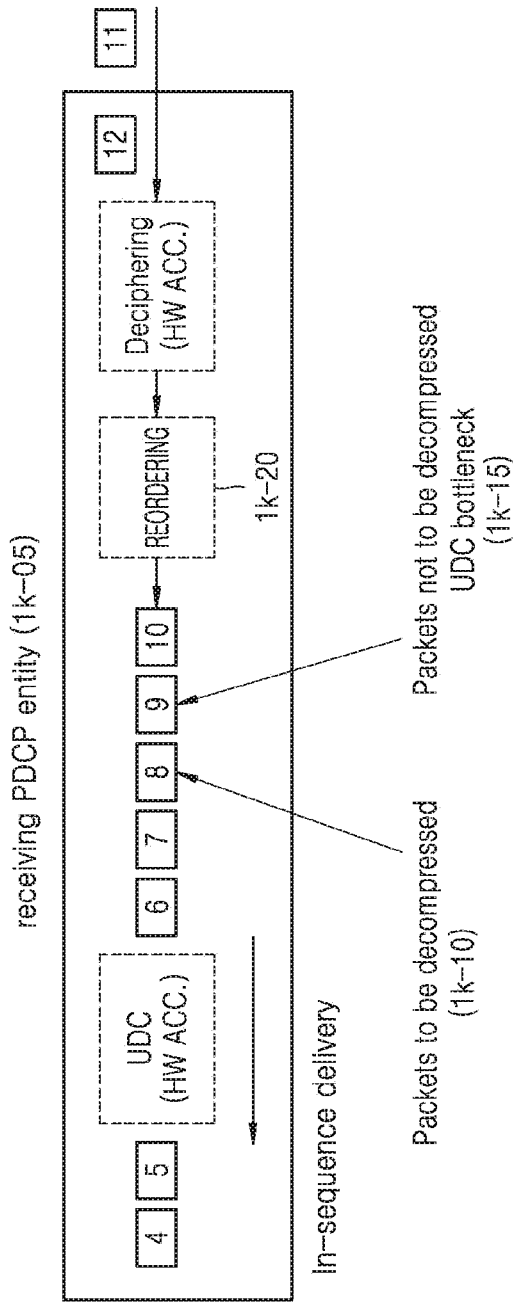
FIG. 1K is a diagram for describing a transmission delay due to a UDC procedure in a receiving PDCP entity.

FIG. 1K is a diagram for describing a transmission delay due to a UDC procedure in a receiving PDCP entity.

Referring to FIG. 1K, when a lower layer is an LTE RLC entity, a receiving PDCP entity 1k-05 may receive PDCP PDUs in order of PDCP sequence number and may receive PDCP PDUs in ascending order of PDCP sequence number although there may be a PDCP sequence number not received or lost in the middle during a handover or in the case of a split bearer. When the lower layer is an NR RLC entity, PDCP PDUs may be received out of sequence in the PDCP sequence number order regardless of the PDCP sequence number order in the order in which data is processed. The receiving PDCP entity should perform reordering based on the PDCP sequence number regardless of whether the lower layer is an LTE RLC layer or an NR RLC layer (1k-20). In FIG. 1K, because the deciphering procedure is performed on all packets, a hardware accelerator may be applied thereto and it may be performed on data received from the lower layer, regardless of the PDCP sequence number order. However, the UDC decompression procedure should perform decompression in the order in which UDC is applied for successful decompression without error as described in FIG. 1G. Thus, when the deciphered data is reordered in ascending order of PDCP sequence number in operation 1k-20 and are ordered in sequence without PDCP sequence numbers lost in the middle thereof, a UDC decompression procedure may be applied to data requiring UDC decompression in order of PDCP sequence number and a UDC decompression procedure may not be applied to data not requiring UDC decompression. The time to wait until data is ordered in ascending order of PDCP sequence number without PDCP sequence numbers lost in the middle in operation 1k-20 may be equal to the time corresponding to a PDCP reordering timer value. When the PDCP reordering timer value passes, that is, when the PDCP reorder timer expires, data may start to be processed in ascending order of PDCP sequence number although there is a PDCP sequence number lost in the middle. When a UDC decompression error occurs, an error recovery procedure may be performed in the transmitting PDCP entity and the receiving PDCP entity.

In the above procedure, because data is processed in order of PDCP sequence number, data 1k-15 on which a UDC decompression procedure is not to be performed should wait due to data (PDCP PDU) 1k-10 to which a UDC decompression procedure requiring a long processing time is to be applied. That is, a bottleneck may occur in the receiving PDCP entity due to the UDC decompression procedure.

Hereinafter, an embodiment of reducing a transmission delay due to a UDC decompression procedure in a receiving PDCP entity will be described.

Figure 1L:
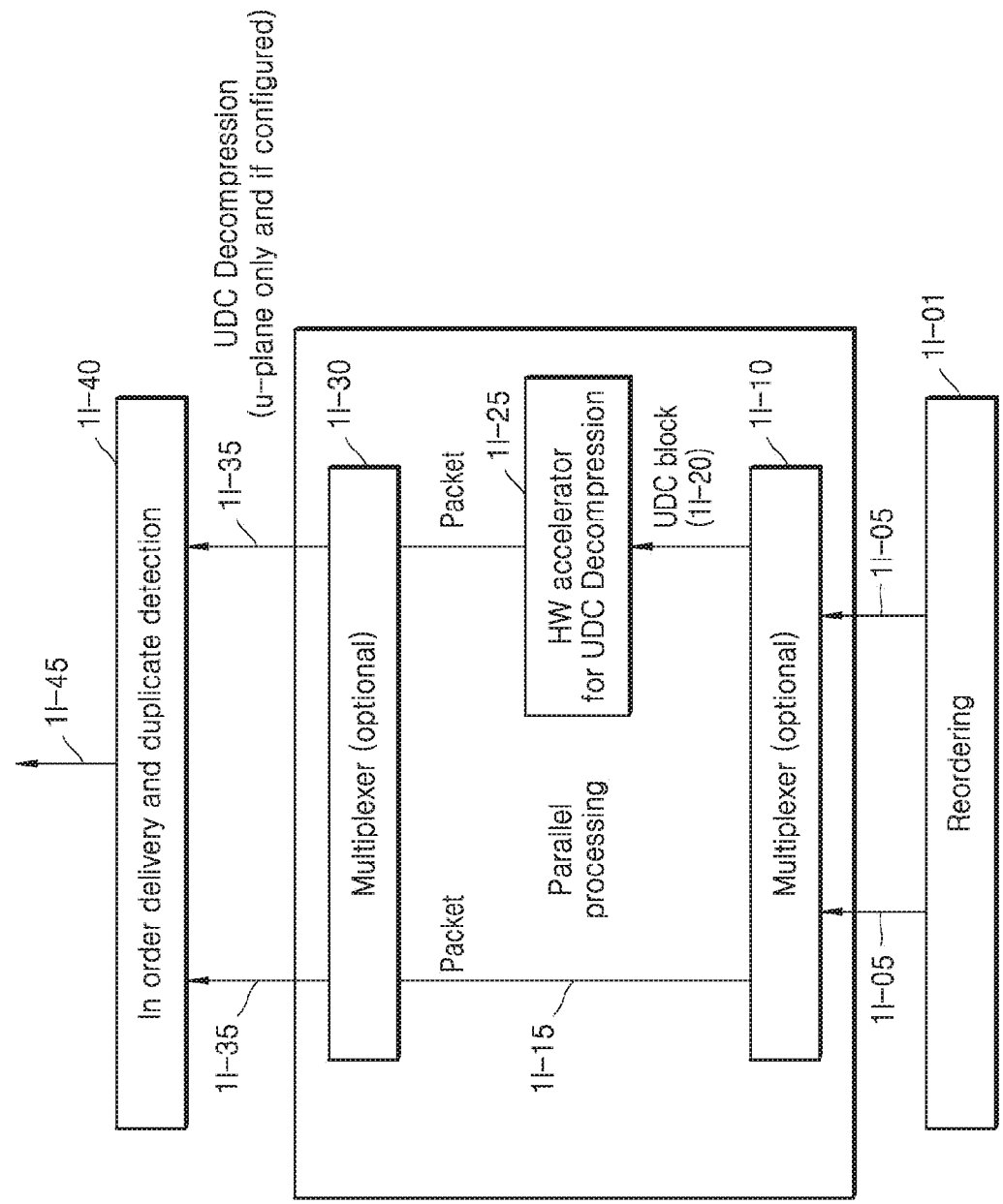
FIG. 1L is a diagram illustrating a parallel processing method for data to which UDC decompression is to be applied and data to which UDC decompression is not to be applied, in a receiving PDCP entity, according to an embodiment.

FIG. 1L is a diagram illustrating a parallel processing method for data to which UDC decompression is to be applied and data to which UDC decompression is not to be applied in a receiving PDCP entity, according to an embodiment.

FIG. 1L illustrates a parallel processing method of the receiving PDCP entity for UDC decompression applicable to the receiving PDCP entities (1h-55 and 1i-65) described in FIGS. 1H and 1I.

Referring to FIG. 1L, when deciphered data is reordered in ascending order of PDCP sequence number in operation 1l-01 and is ordered in sequence without PDCP sequence numbers lost in the middle thereof, a UDC decompression procedure may be applied to data requiring UDC decompression in order of PDCP sequence number and a UDC decompression procedure may not be applied to data not requiring a UDC decompression procedure. The time to wait until data is ordered in ascending order of PDCP sequence number without PDCP sequence numbers lost in the middle in operation 1l-01 may be equal to the time corresponding to a PDCP reordering timer value. When the PDCP reordering timer value passes, that is, when the PDCP reorder timer expires, data may start to be processed in ascending order of PDCP sequence number although there is a PDCP sequence number lost in the middle. When a UDC decompression error occurs, an error recovery procedure may be performed in the transmitting PDCP entity and the receiving PDCP entity.

When data is ordered in sequence without lost PDCP sequence numbers in operation 1l-01, parallel processing may be performed in order of PDCP sequence number by distinguishing between data requiring UDC decompression and data not requiring a UDC decompression procedure (1l-15 and 1l-20). That is, a UDC decompression procedure may not be applied to data not requiring a UDC decompression procedure and it may prepare to be transmitted to an upper layer (1l-15 and 1l-30), and a UDC decompression procedure may be applied to data requiring a UDC decompression procedure to restore the original data and it may prepare to be transmitted to the upper layer (1*l*-20 and 1*l*-25). A hardware accelerator 1*l*-25 may be applied to the UDC decompression procedure to repetitively perform a UDC decompression procedure on data requiring a UDC decompression procedure. Also, data not requiring UDC decompression may be processed by a main CPU. As for the data to which the UDC decompression procedure is not applied and the data to which the UDC decompression procedure is applied, the data processed in parallel in operation 1*l*-30 may be transmitted in order of processing (1*l*-35) to perform reordering (1*l*-40). In operation 1*l*-40, the receiving PDCP entity may order the data to which the UDC decompression procedure is not applied and the data to which the UDC decompression procedure is applied, which are processed in parallel, in ascending order of PDCP sequence number and transmit the data to the upper layer in sequence (1*l*-45).

According to the above embodiment, by distinguishing between the data requiring UDC decompression and the data not requiring a UDC decompression procedure and processing the same in parallel, the efficiency of the hardware accelerator applied to the UDC decompression procedure may be increased and the processing time due to the UDC decompression procedure may be reduced.

In the above parallel processing method, multiplexers 1*l*-10 and 1*l*-30 may be implemented for multiplexing when necessary and it may be implemented without multiplexing.

Figure 1M:
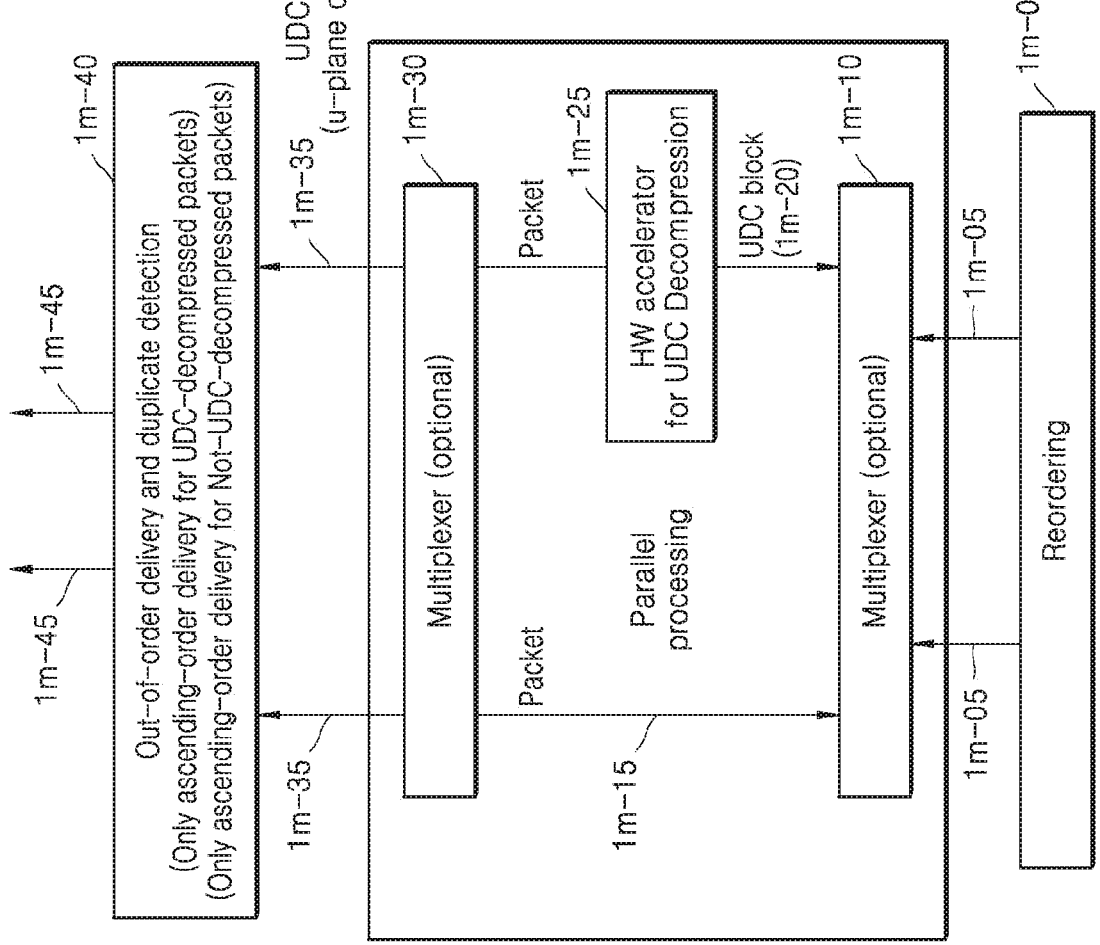
FIG. 1M is a diagram illustrating a parallel processing method for data to which UDC decompression is applied and data to which UDC decompression is not to be applied, in a receiving PDCP entity, according to another embodiment.

FIG. 1M is a diagram illustrating a parallel processing method for data to which UDC decompression is applied and data to which UDC decompression is not to be applied in a receiving PDCP entity according to another embodiment.

FIG. 1M illustrates a parallel processing method of the receiving PDCP entity for UDC decompression applicable to the receiving PDCP entities (1*h*-55 and 1*i*-65) described in FIGS. 1H and 1I.

Referring to FIG. 1M, when deciphered data is reordered in ascending order of PDCP sequence number in operation 1*m*-01 and is ordered in sequence without PDCP sequence numbers lost in the middle thereof, a UDC decompression procedure may be applied to data requiring UDC decompression in order of PDCP sequence number and a UDC decompression procedure may not be applied to data not requiring a UDC decompression procedure. The time to wait until data is ordered in ascending order of PDCP sequence number without PDCP sequence numbers lost in the middle in operation 1*m*-01 may be equal to the time corresponding to a PDCP reordering timer value. When the PDCP reordering timer value passes, that is, when the PDCP reorder timer expires, data may start to be processed in ascending order of PDCP sequence number although there is a PDCP sequence number lost in the middle. When a UDC decompression error occurs, an error recovery procedure may be performed in the transmitting PDCP entity and the receiving PDCP entity.

When data is ordered in sequence without lost PDCP sequence numbers in operation 1*m*-01, parallel processing may be performed in order of PDCP sequence number by distinguishing between data requiring UDC decompression and data not requiring a UDC decompression procedure (1*m*-15 and 1*m*-20). That is, a UDC decompression procedure may not be applied to data not requiring a UDC decompression procedure and it may prepare to be transmitted to an upper layer (1*m*-15 and 1*m*-30), and a UDC decompression procedure may be applied to data requiring a UDC decompression procedure to restore the original data and it may prepare to be transmitted to the upper layer (1*m*-20 and 1*m*-25). A hardware accelerator 1*m*-25 may be applied to the UDC decompression procedure to repetitively perform a UDC decompression procedure on data requiring a UDC decompression procedure. Also, data not requiring UDC decompression may be processed by a main CPU. As for the data to which the UDC decompression procedure is not applied and the data to which the UDC decompression procedure is applied, the data processed in parallel in operation 1*m*-30 may be transmitted in order of processing (1*m*-35) to perform reordering (1*m*-40). That is, in operation 1*m*-30, a multiplexer may transmit the first-processed data first (FIFO).

In operation 1*m*-40, the receiving PDCP entity may receive data not ordered in order of PDCP sequence number when receiving the data to which the UDC decompression procedure is not applied and the data to which the UDC decompression procedure is applied in order of data processing or in parallel (1*m*-35). However, when data is ordered in order of PDCP sequence number without PDCP sequence numbers lost in the middle in operation 1*m*-01 (when the PDCP reordering timer expires, data processing starts even when there is a loss), because data is distinguished and processed in parallel in order of PDCP sequence number, data (1*m*-15) to which the UDC decompression procedure is not applied and data (1*m*-25) to which the UDC decompression procedure is applied, which are received in operation 1*m*-40, may be distinguished from each other and automatically ordered in ascending order of PDCP sequence number. That is, the data to which the UDC decompression procedure is not applied may be ordered in ascending order of PDCP sequence number and received in 1*m*-35, and the data to which the UDC decompression procedure is applied may be ordered in ascending order of PDCP sequence number and received in 1*m*-35.

In operation 1*m*-40, the data (1*m*-15) to which the UDC decompression procedure is not applied and the data (1*m*-25) to which the UDC decompression procedure is applied, which are received in 1*m*-35, may be transmitted to the upper layer in the order of being first processed (FIFO). That is, data may not be transmitted in order of PDCP sequence number, data to which a UDC decompression procedure is not applied may be ordered in ascending order of PDCP sequence number to be transmitted, and data to which a UDC decompression procedure may be ordered in ascending order of PDCP sequence number to be transmitted to the upper layer, wherein the first-processed data among the data (1*m*-15) to which the UDC decompression procedure is not applied and the data (1*m*-25) to which the UDC decompression procedure is applied may be first transmitted to the upper layer (FIFO).

In general, when data is transmitted from a PDCP entity to an upper layer, a data throughput may degrade when the data is not transmitted in ascending order of PDCP sequence number. However, because different upper layers may transmit/receive data in one PDCP entity, a data throughput may not degrade when only data corresponding to each upper layer transmitted to each upper layer is transmitted in sequence.

In an embodiment, data to which UDC compression is applied and data to which UDC compression is not applied may be data transmitted/received in different upper layers. Thus, when data to which a UDC decompression procedure is not applied is ordered in ascending order of PDCP sequence number to be transmitted, and data to which a UDC decompression procedure is applied is ordered in ascending order of PDCP sequence number and to be transmitted to the upper layer, a data throughput may not degrade.

Also, because data to which UDC compression is not applied, which does not require a UDC decompression procedure, may be first processed and transmitted to the upper layer during the processing time taken to perform a UDC decompression procedure on data to which UDC compression is applied, a bottleneck due to the UDC decompression described in FIG. 1K may not occur.

According to the above embodiment, by distinguishing between the data requiring UDC decompression and the data not requiring a UDC decompression procedure and processing the same in parallel, the efficiency of the hardware accelerator applied to the UDC decompression procedure may be increased and the processing time due to the UDC decompression procedure may be reduced. Also, because data to which UDC compression is not applied, which does not require a UDC decompression procedure, may be first processed and transmitted to the upper layer during the processing time taken to perform a UDC decompression procedure on data to which UDC compression is applied, a transmission delay may be reduced.

In the above parallel processing method, multiplexers 1*m*-10 and 1*m*-30 may be implemented for multiplexing when necessary and it may be implemented without multiplexing.

The embodiment illustrated in FIG. 1M will be described with a particular example.

The transmitting PDCP entity may apply UDC compression to data corresponding to PDCP sequence numbers 1, 3, 5, 7, and 9 and may not apply UDC compression to data (PDCP SDU) corresponding to PDCP sequence numbers 2, 4, 6, and 8, prior to transmission. Upon receiving the PDCP sequence numbers 4, 1, 5, 3, 6, 7, 8, and 9, the receiving PDCP entity may order the same into 1, 3, 4, 5, 6, 7, 8, and 9, may check a header (UDC header or PDCP header) to determine whether the data corresponding to the PDCP sequence number 1 is UDC-applied data or UDC-unapplied data, and may perform data processing accordingly. When the PDCP sequence number 2 arrives before the PDCP reordering timer expires, the data corresponding to the PDCP sequence numbers 2, 3, 4, 5, 6, 7, 8, and 9 may be distinguished by the application/non-application of UDC, UDC decompression may be applied by applying a hardware accelerator to 3, 5, 7, and 9 to which UDC is applied, and simultaneously the main CPU may perform data processing in parallel on 2, 4, 6, and 8 to which UDC is not applied and transmit the result to the upper layer. Because parallel processing is performed, the first-processed data may be first transmitted to the upper layer. That is, data may be transmitted to the upper layer in the order of the PDCP sequence numbers 2, 4, 3, 6, 8, 5, 7, and 9. However, as described above, data to which UDC is applied may be automatically transmitted in ascending order of PDCP sequence number, that is, in the order of 3, 5, 7, and 9, and data to which UDC is not applied may be transmitted in ascending order of PDCP sequence number. That is, the data may be transmitted in the order of 2, 4, 6, and 8.

Figure 1N:
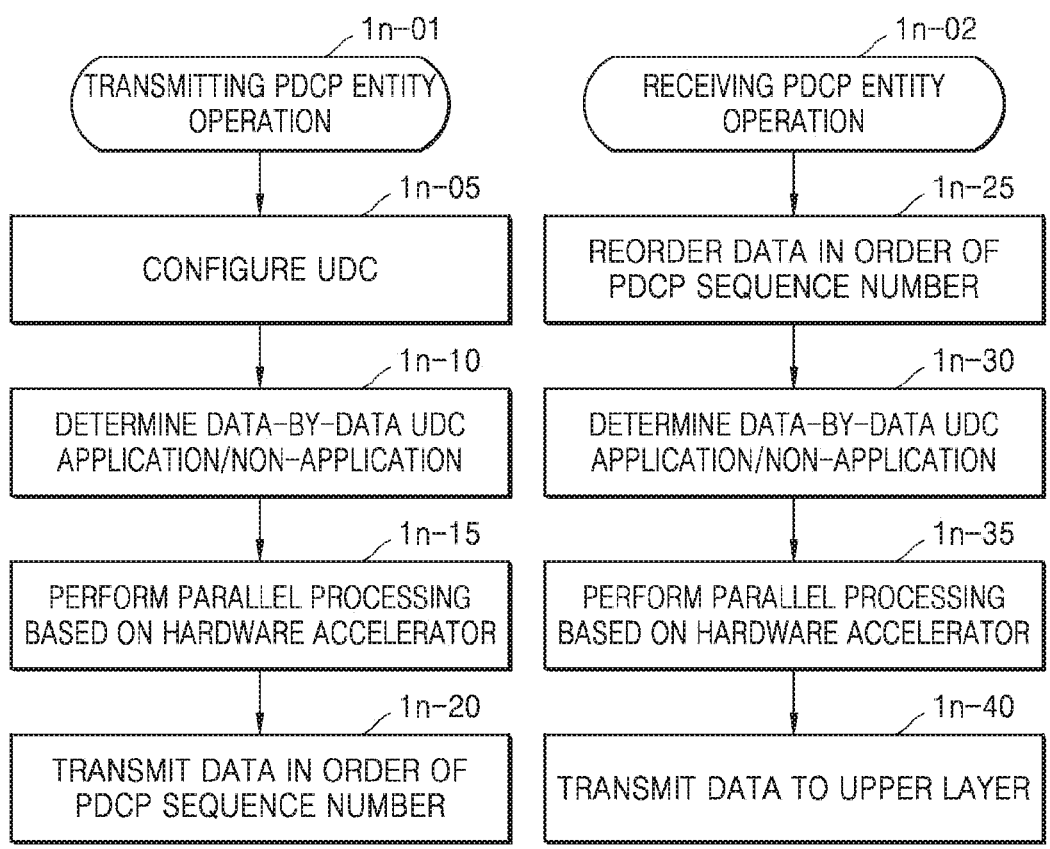
FIG. 1N is a diagram illustrating an operation of a transmitting PDCP entity and an operation of a receiving PDCP entity according to an embodiment.
Figure 10:
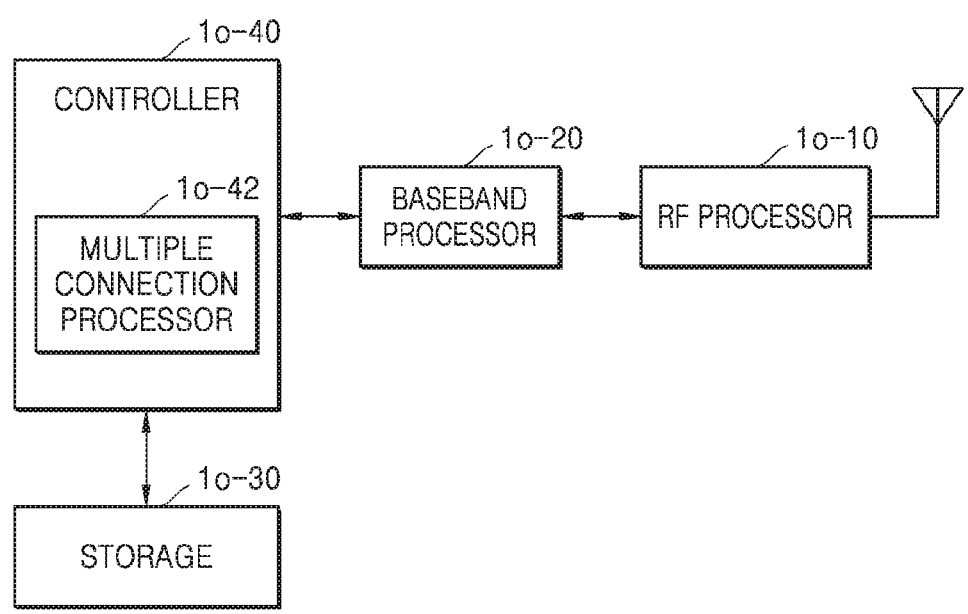

FIG. 1N is a diagram illustrating an operation of a transmitting PDCP entity and an operation of a receiving PDCP entity according to an embodiment.

Referring to FIG. 1N, the transmitting PDCP entity may be configured as to whether to apply UDC of the PDCP entity via the RRC message of FIG. 1E (1*n*-05) and may determine whether to apply UDC for each data according to configuration information with respect to data received from the upper layer (1*n*-10). In this case, whether to apply UDC for each data is determined, parallel processing may be performed by using the hardware accelerator (1*n*-15). Then, the data may be transmitted to the lower layer in order of PDCP sequence number (1*n*-20).

Referring to FIG. 1N, the receiving PDCP entity may reorder the received data in order of PDCP sequence number (1*n*-25). When data is ordered in order of PDCP sequence number without PDCP sequence numbers lost in the middle in operation 1*n*-25 (when the PDCP reordering timer expires, data processing starts even when there is a loss), whether to apply UDC for each data may be determined (1*n*-30) and parallel processing may be performed by using the hardware accelerator (1*n*-35). According to an embodiment, data may be transmitted to the upper layer in order of PDCP sequence number. Also, according to an embodiment, data may be transmitted to the upper layer in the order of being first processed in parallel processing, not in order of PDCP sequence number, data to which a UDC decompression procedure is not applied may be ordered in ascending order of PDCP sequence number and then transmitted, and data to which a UDC decompression procedure is applied may be ordered in ascending order of PDCP sequence number and then transmitted to the upper layer (1*n*-40).

FIG. 1O is a block diagram illustrating a structure of a terminal according to the present disclosure.

Referring to FIG. 1O, the terminal may include a radio frequency (RF) processor 1*o*-10, a baseband processor 1*o*-20, a storage 1*o*-30, and a controller 1*o*-40.

The RF processor 1*o*-10 may perform functions for transmitting/receiving signals through wireless channels, such as band conversion and amplification of signals. That is, the RF processor 1*o*-10 may up-convert a baseband signal provided from the baseband processor 1*o*-20 into an RF band signal and transmit the same through an antenna and may down-convert an RF band signal received through the antenna into a baseband signal. For example, the RF processor 1*o*-10 may include a transmission filter, a reception filter, an amplifier, a mixer, an oscillator, a digital-to-analog converter (DAC), and an analog-to-digital converter (ADC). Although only one antenna is illustrated in the drawings, the terminal may include a plurality of antennas. Also, the RF processor 1*o*-10 may include a plurality of RF chains. In addition, the RF processor 1*o*-10 may perform beamforming. For beamforming, the RF processor 1*o*-10 may adjust the phase and magnitude of each of the signals transmitted/received through a plurality of antennas or antenna elements. Also, the RF processor may perform multiple-input and multiple-output (MIMO) and may receive multiple layers when performing a MIMO operation. Under the control of the controller, the RF processor 1*o*-10 may perform reception beam sweeping by suitably configuring a plurality of antennas or antenna elements or may adjust the direction and width of a reception beam so that the reception beam may be coordinated with a transmission beam.

The baseband processor 1*o*-20 may perform a conversion function between a baseband signal and a bitstream according to the physical layer standard of the system. For example, during data transmission, the baseband processor 1*o*-20 may generate complex symbols by encoding and modulating a transmission bitstream. Also, during data reception, the baseband processor 1*o*-20 may restore a reception bitstream by demodulating and decoding the baseband signal provided from the RF processor 1*o*-10. For example, according to an OFDM scheme, during data transmission, the baseband processor 1*o*-20 may generate complex symbols by encoding and modulating a transmission bitstream, map the complex symbols to subcarriers, and then configure OFDM symbols through an inverse fast Fourier transform (IFFT) operation and cyclic prefix (CP) insertion. Also, during data reception, the baseband processor 1o-20 may divide a baseband signal provided from the RF processor 1o-10 into OFDM symbol units, restore signals mapped to the subcarriers through a fast Fourier transform (FFT) operation, and then restore a reception bitstream through demodulation and decoding.

The baseband processor 1o-20 and the RF processor 1o-10 may transmit and receive signals as described above. Accordingly, the baseband processor 1o-20 and the RF processor 1o-10 may be referred to as a transmitter, a receiver, a transceiver, or a communicator. In addition, at least one of the baseband processor 1o-20 and the RF processor 1o-10 may include a plurality of communication modules to support a plurality of different radio access technologies. Also, at least one of the baseband processor 1o-20 and the RF processor 1o-10 may include a plurality of communication modules to process signals of different frequency bands. For example, the different wireless access technologies may include wireless LAN (e.g., IEEE 802.11) and cellular network (e.g., LTE). Also, the different frequency bands may include a super high frequency (SHF) (e.g., 2.5 GHz, 2.NR Hz, 5 GHz, or NR Hz) band and a millimeter wave (e.g., 60 GHz) band.

The storage 1o-30 may store data such as a basic program, an application program, or configuration information for an operation of the terminal. In an embodiment, the storage 1o-30 may provide the stored program, data, or the like at the request of the controller 1o-40.

The controller 1o-40 may control overall operations of the terminal. For example, the controller 1o-40 may transmit/receive signals through the baseband processor 1o-20 and the RF processor 1o-10. Also, the controller 1o-40 may write/read data into/from the storage 1o-30. For this purpose, the controller 1o-40 may include at least one processor. For example, the controller 1o-40 may include a communication processor (CP) for performing control for communication and an application processor (AP) for controlling an upper layer such as an application program. In addition, the controller 1o-40 may include a multiple connection processor 1o-42 performing a process for operating in a multiple connection mode. In an embodiment, the controller 1o-40 may receive data to perform reordering in order of PDCP sequence number, determine whether to apply UDC for each data, process the data by using a hardware accelerator, and transmit the processed data to the upper layer.

Figure 1P:
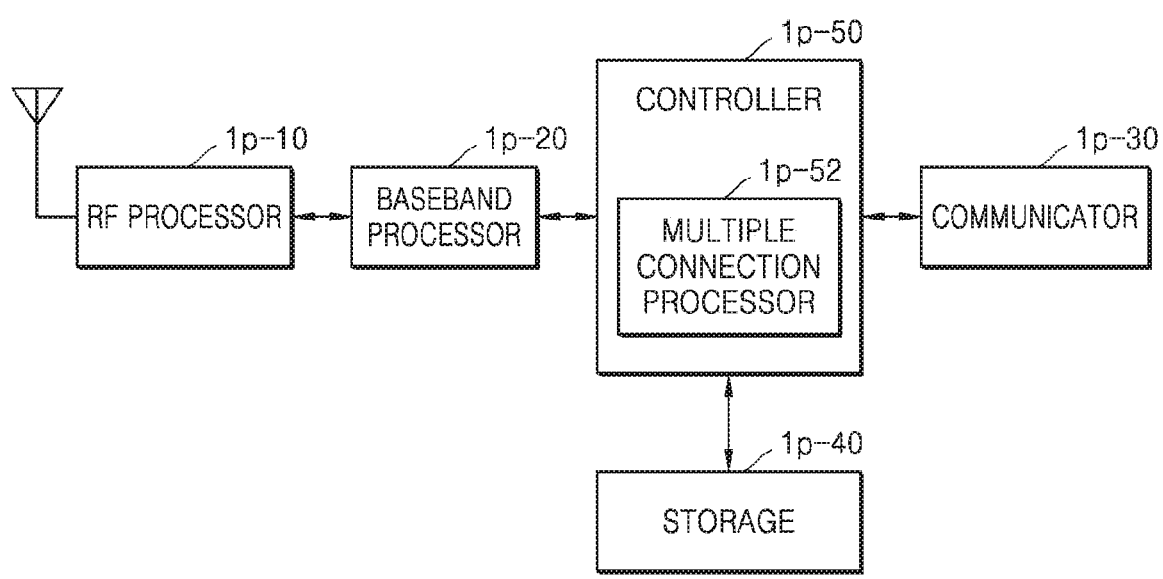
FIG. 1P is a block diagram illustrating a structure of a base station according to an embodiment.

FIG. 1P is a block diagram illustrating a structure of a base station according to an embodiment.

As illustrated in FIG. 1P, the base station may include an RF processor 1p-10, a baseband processor 1p-20, a backhaul communicator 1p-30, a storage 1p-40, and a controller 1p-50.

The RF processor 1p-10 may perform functions for transmitting/receiving signals through wireless channels, such as band conversion and amplification of signals. That is, the RF processor 1p-10 may up-convert a baseband signal provided from the baseband processor 1p-20 into an RF band signal and transmit the same through an antenna and may down-convert an RF band signal received through the antenna into a baseband signal. For example, the RF processor 1p-10 may include a transmission filter, a reception filter, an amplifier, a mixer, an oscillator, a DAC, and an ADC. Although only one antenna is illustrated in the drawings, a first access node may include a plurality of antennas. Also, the RF processor 1p-10 may include a plurality of RF chains. In addition, the RF processor 1p-10 may perform beamforming. For beamforming, the RF processor 1p-10 may adjust the phase and magnitude of each of the signals transmitted/received through a plurality of antennas or antenna elements. The RF processor may perform a downlink MIMO operation by transmitting one or more layers.

The baseband processor 1p-20 may perform a conversion function between a baseband signal and a bitstream according to the physical layer standard of the first radio access technology. For example, during data transmission, the baseband processor 1p-20 may generate complex symbols by encoding and modulating a transmission bitstream. Also, during data reception, the baseband processor 1p-20 may restore a reception bitstream by demodulating and decoding the baseband signal provided from the RF processor 1p-10. For example, according to the OFDM scheme, during data transmission, the baseband processor 1p-20 may generate complex symbols by encoding and modulating a transmission bitstream, map the complex symbols to subcarriers, and then configure OFDM symbols through an IFFT operation and CP insertion. Also, during data reception, the baseband processor 1p-20 may divide a baseband signal provided from the RF processor 1p-10 into OFDM symbol units, restore signals mapped to the subcarriers through an FFT operation, and then restore a reception bitstream through demodulation and decoding. The baseband processor 1p-20 and the RF processor 1p-10 may transmit and receive signals as described above. Accordingly, the baseband processor 1p-20 and the RF processor 1p-10 may be referred to as a transmitter, a receiver, a transceiver, a communicator, or a wireless communicator.

The backhaul communicator 1p-30 may provide an interface for communicating with other nodes in the network. That is, the backhaul communicator 1p-30 may convert a bitstream transmitted from a main base station to another node, for example, an auxiliary base station, a core network, or the like, into a physical signal and may convert a physical signal received from another node into a bitstream.

The storage 1p-40 may store data such as a basic program, an application program, or configuration information for an operation of the base station. Particularly, the storage 1p-40 may store information about a bearer allocated to a connected terminal, a measurement result reported from the connected terminal, or the like. Also, the storage 1p-40 may store information that is a reference for determining whether to provide or terminate a multiple connection to the terminal. Also, the storage 1p-40 may provide the stored program, data, or the like at the request of the controller 1p-50.

The controller 1p-50 may control overall operations of the main base station. For example, the controller 1p-50 may transmit/receive signals through the baseband processor 1p-20 and the RF processor 1p-10 or through the backhaul communicator 1p-30. Also, the controller 1p-50 may write/read data into/from the storage 1p-40. For this purpose, the controller 1p-50 may include at least one processor. In addition, the controller 1p-50 may include a multiple connection processor 1p-52 performing a process for operating in a multiple connection mode. In an embodiment, the controller 1p-50 may receive data from the upper layer to receive configuration about the UDC application/non-application of the PDCP entity, determine whether to apply UDC for each data according to the configuration information, use a hardware accelerator to perform parallel processing, and transmit the processed data to the lower layer in order of PDCP sequence number.

The methods according to the embodiments of the present disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the present disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the present disclosure. Also, a separate storage device on a communication network may be connected to an apparatus performing an embodiment of the present disclosure.

In the above particular embodiments of the present disclosure, the components included in the present disclosure are expressed in the singular or plural according to the presented particular embodiments of the present disclosure. However, the singular or plural expressions are selected suitably according to the presented situations for convenience of description, the present disclosure is not limited to the singular or plural components, and the components expressed in the plural may even be configured in the singular or the components expressed in the singular may even be configured in the plural.

It should be understood that the embodiments of the present disclosure described herein should be considered in a descriptive sense only and not for purposes of limitation. That is, it will be understood by those of ordinary skill in the art that various changes in form and details may be made in the embodiments of the present disclosure without departing from the scope of the present disclosure. Also, the embodiments of the present disclosure may be operated in combination when necessary. For example, the base station and the terminal may be operated according to a combination of portions of an embodiment and another embodiment of the present disclosure. Also, although the above embodiments of the present disclosure are presented based on FDD LTE systems, other modifications based on the technical spirit of the embodiments of the present disclosure may also be implemented in other systems such as TDD LTE systems and 5G or NR systems.

The invention claimed is:

1. A method performed by a transmitting packet data convergence protocol (PDCP) entity of a user equipment (UE) communicating with a base station on a Uu interface or with another UE on a PC5 interface in a wireless communication system, the method comprising:
identifying that an uplink data compression (UDC) is configured, based on a radio resource control (RRC) message indicating a UDC configuration, wherein the RRC message indicates an identifier of a predefined dictionary for the UDC;
receiving first data and second data, from an upper layer;
generating a UDC data block by performing compression on the first data, based on the UDC configuration, wherein the second data is not compressed based on a compression related data rate;
generating a first UDC packet by adding a first UDC header to the UDC data block;
generating a second UDC packet by adding a second UDC header to the second data, wherein the first UDC header indicates that the first UDC packet is compressed and the second UDC header indicates that the second UDC packet is not compressed;
performing integrity protection to the first UDC packet and the second UDC packet, wherein the integrity protection is applied to user plane;
based on the identifying that the UDC is configured, determining both of the first UDC header and the UDC data block and both of the second UDC header and the second data, to be ciphered;
performing ciphering on both of the first UDC header and the UDC data block and both of the second UDC header and the second data, based on the determining;
generating first resulting data by adding a first PDCP header to the first UDC packet;
generating second resulting data by adding a second PDCP header to the second UDC packet; and
transmitting the first resulting data and the second resulting data to a lower layer.

2. The method of claim 1, wherein the UDC configuration indicates to perform the UDC on a bearer configured to a radio link control acknowledged mode (RLC AM).

3. The method of claim 1, wherein the UDC configuration indicates to apply the UDC only when robust header compression (ROHC) is not used.

4. The method of claim 1, wherein the first UDC header includes a checksum bit for checking validity of a UDC buffer.

5. The method of claim 1,
wherein the receiving of the first data from the upper layer comprises allocating PDCP sequence numbers to the first data in order of reception, and
wherein the transmitting of the first resulting data to the lower layer comprises transmitting the first resulting data to the lower layer in order of the PDCP sequence numbers.

6. A transmitting packet data convergence protocol (PDCP) entity of a user equipment (UE) communicating with a base station on a Uu interface or with another UE on a PC5 interface in a wireless communication system, the transmitting PDCP entity comprising:
a transceiver; and
at least one processor coupled to the transceiver and configured to:
identify that an uplink data compression (UDC) is configured, based on a radio resource control (RRC) message indicating a UDC configuration, wherein the RRC message indicates an identifier of a predefined dictionary for the UDC,
receive first data and second data from an upper layer, generate a UDC data block by performing compression on the first data, based on the UDC configuration, wherein the second data is not compressed based on a compression related data rate, generate a first UDC packet by adding a first UDC header to the UDC data block, generate a second UDC packet by adding a second UDC header to the second data, wherein the first UDC header indicates that the first UDC packet is compressed and the second UDC header indicates that the second UDC packet is not compressed, perform integrity protection to the first UDC packet and the second UDC packet, wherein the integrity protection is applied to user plane, based on the identifying that the UDC is configured, determine both of the first UDC header and the UDC data block and both of the second UDC header and the second data, to be ciphered, perform ciphering on both of the first UDC header and the UDC data block and both of the second UDC header and the second data, based on the determining, generate a first resulting data by adding a first PDCP header to the first UDC packet, generate a second resulting data by adding a second PDCP header to the second UDC packet, and transmit the first resulting data and the second resulting data to a lower layer.

\* \* \* \* \*